United States Patent [19]

Trinchieri

[11] 4,224,664
[45] Sep. 23, 1980

[54] APPARATUS FOR DETECTING WHEN THE ACTIVITY OF ONE PROCESS IN RELATION TO A COMMON PIECE OF INFORMATION INTERFERES WITH ANY OTHER PROCESS IN A MULTIPROGRAMMING/MULTIPROCESSING COMPUTER SYSTEM

[75] Inventor: Mario G. Trinchieri, Weston, Mass.
[73] Assignee: Honeywell Information Systems Inc., Waltham, Mass.
[21] Appl. No.: 684,345
[22] Filed: May 7, 1976
[51] Int. Cl.³ .................................................. G06F 9/46
[52] U.S. Cl. .................................................. 364/200
[58] Field of Search ................. 340/172.5; 445/1; 444/1; 364/200 MS File, 900 MS File, 300

[56] References Cited
U.S. PATENT DOCUMENTS

| 3,469,239 | 9/1969 | Richmond et al. | 340/172.5 |
| 3,528,062 | 9/1970 | Lehman et al. | 340/172.5 |
| 3,530,438 | 9/1970 | Mellen et al. | 340/172.5 |
| 3,573,736 | 4/1971 | Schlaeppi | 340/172.5 |
| 3,631,405 | 12/1971 | Hoff et al. | 340/172.5 |
| 3,706,077 | 12/1972 | Mori et al. | 340/172.5 |
| 3,886,525 | 5/1975 | Brown et al. | 340/172.5 |
| 3,893,084 | 7/1975 | Kotok et al. | 364/200 |
| 4,096,561 | 6/1978 | Trinchieri | 364/200 |

Primary Examiner—Melvin B. Chapnick
Attorney, Agent, or Firm—George Grayson; Nicholas Prasinos; Ronald T. Reiling

[57] ABSTRACT

A multiprogramming/multiprocessing computer system for executing a plurality of processes sharing common information in the form of records, pages or messages, employing an apparatus for avoiding an interference between two processes seeking access to elements of common information. The system operates to store in a first memory utilization data in table form identifying the processes which have accessed each individual element of common information. A second memory stores a matrix of precedence data representing the relative order in which processes must access the common information in accordance with a predetermined set of access rules. When a first process enters a request to access an element of common information, the system identifies from the utilization table any other process which, according to the access rules, must be given precedence to the common information over the first process. Thereafter, the system inspects the second memory and determines from the precedence data therein whether any inverse precedence relationships have been detected and, if so, rejects the access request entered by the first process and moves on to process the next access request.

10 Claims, 36 Drawing Figures

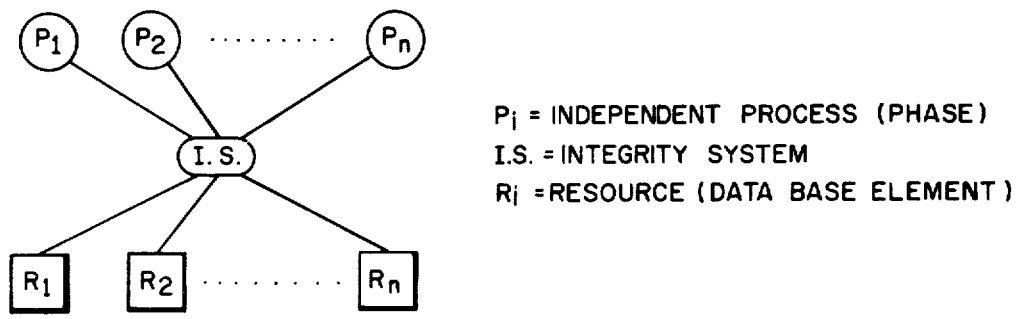
$P_i$ = INDEPENDENT PROCESS (PHASE)
I.S. = INTEGRITY SYSTEM
$R_i$ = RESOURCE (DATA BASE ELEMENT)
FIG. 1
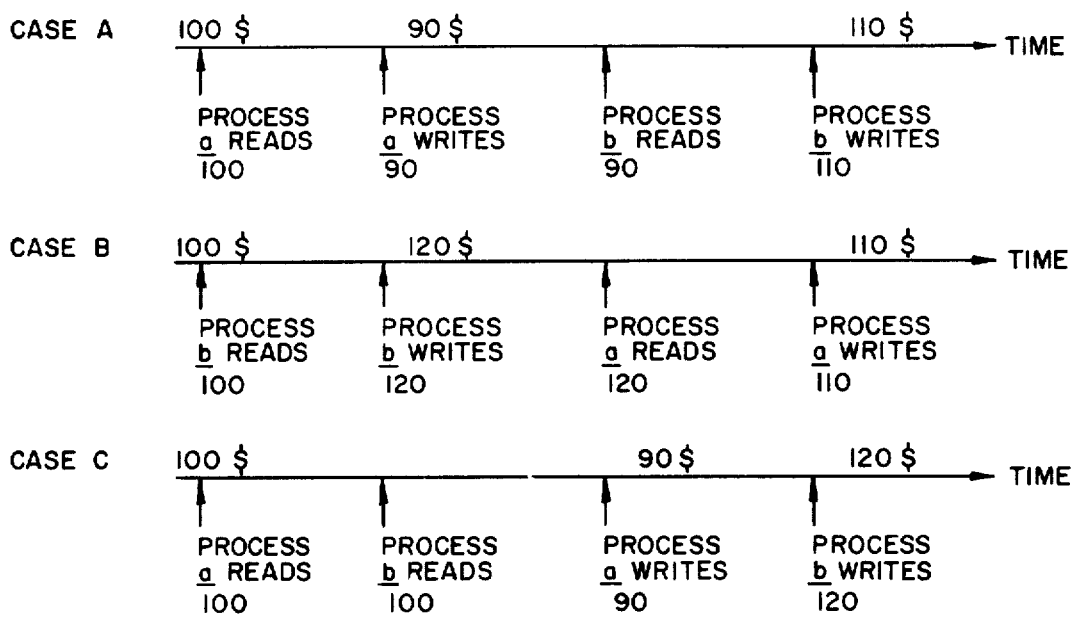
FIG. 2
FIG. 2d

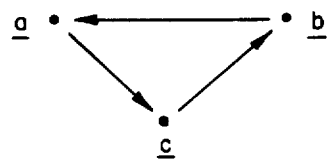
FIG. 5c
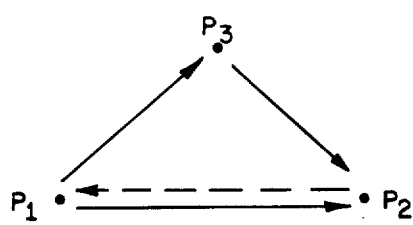
FIG. 5d
LEADERS
FOLLOWERS
|  | $P_1$ | $P_2$ | $P_3$ | $P_4$ |
|---|---|---|---|---|
| $P_1$ | 0 | 0 | 0 | 0 |
| $P_2$ | 1 | 0 | 0 | 0 |
| $P_3$ | 1 | 3 | 0 | 1 |
| $P_4$ | 1 | 1 | 0 | 0 |
FIG. 6a
MATRIX OF RELATIONS
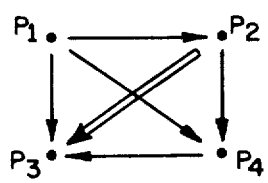
FIG. 6b
EQUIVALENT GRAPH

UTILIZATION TABLES

MATRIX OF RELATIONS

AFFECTED RESOURCES LISTS

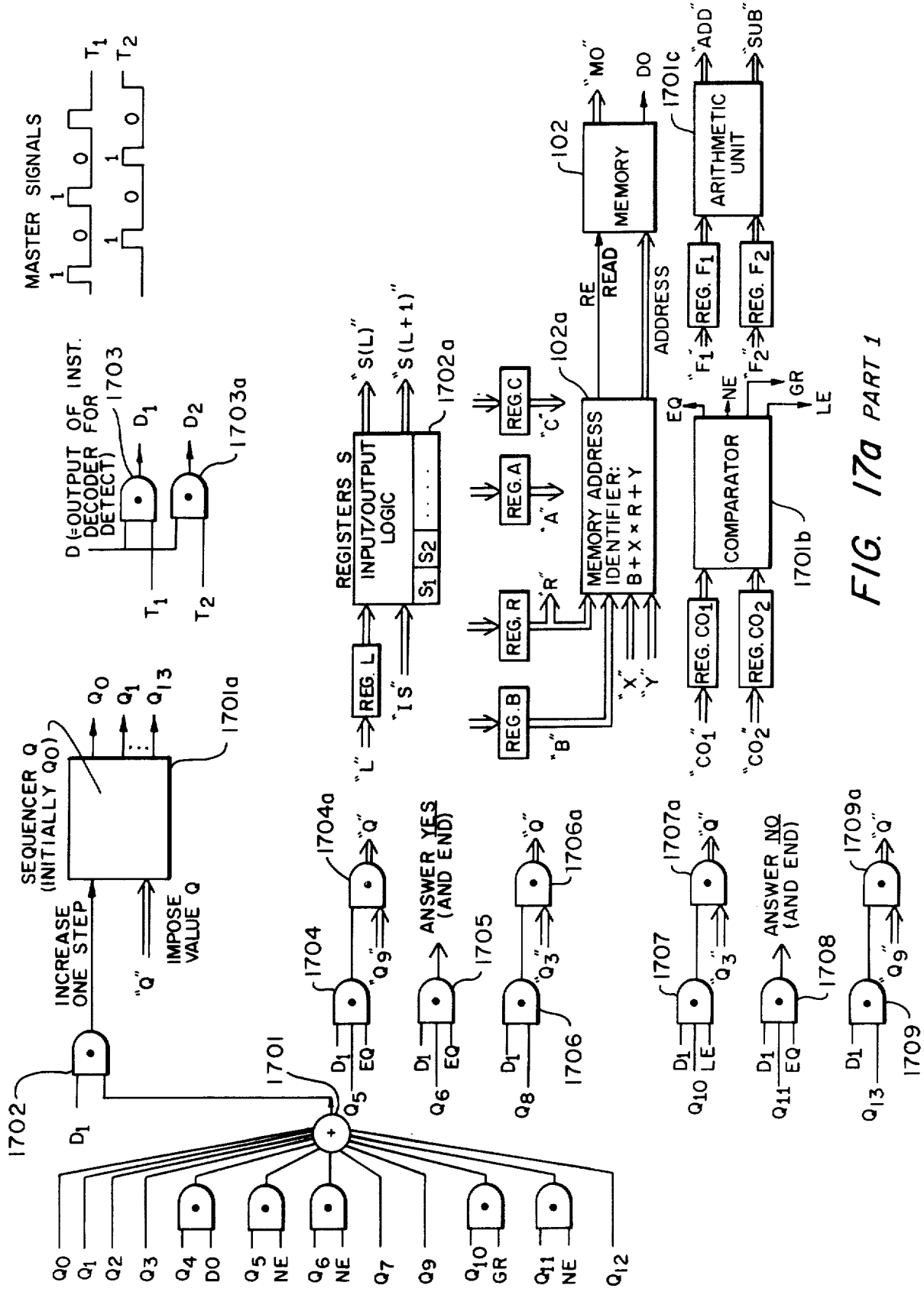
FIG. 17a PART 1

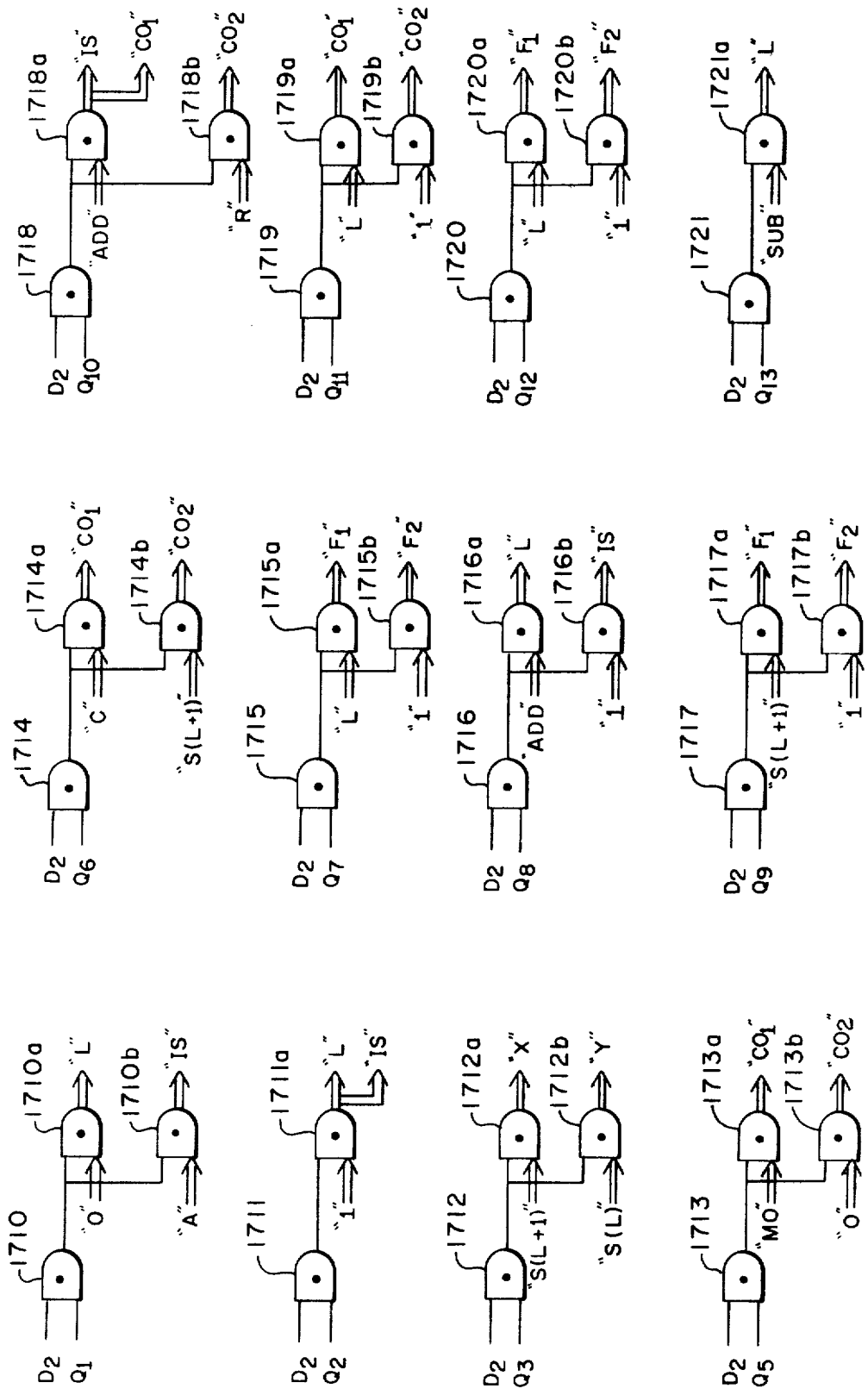
FIG. 17a PART 2

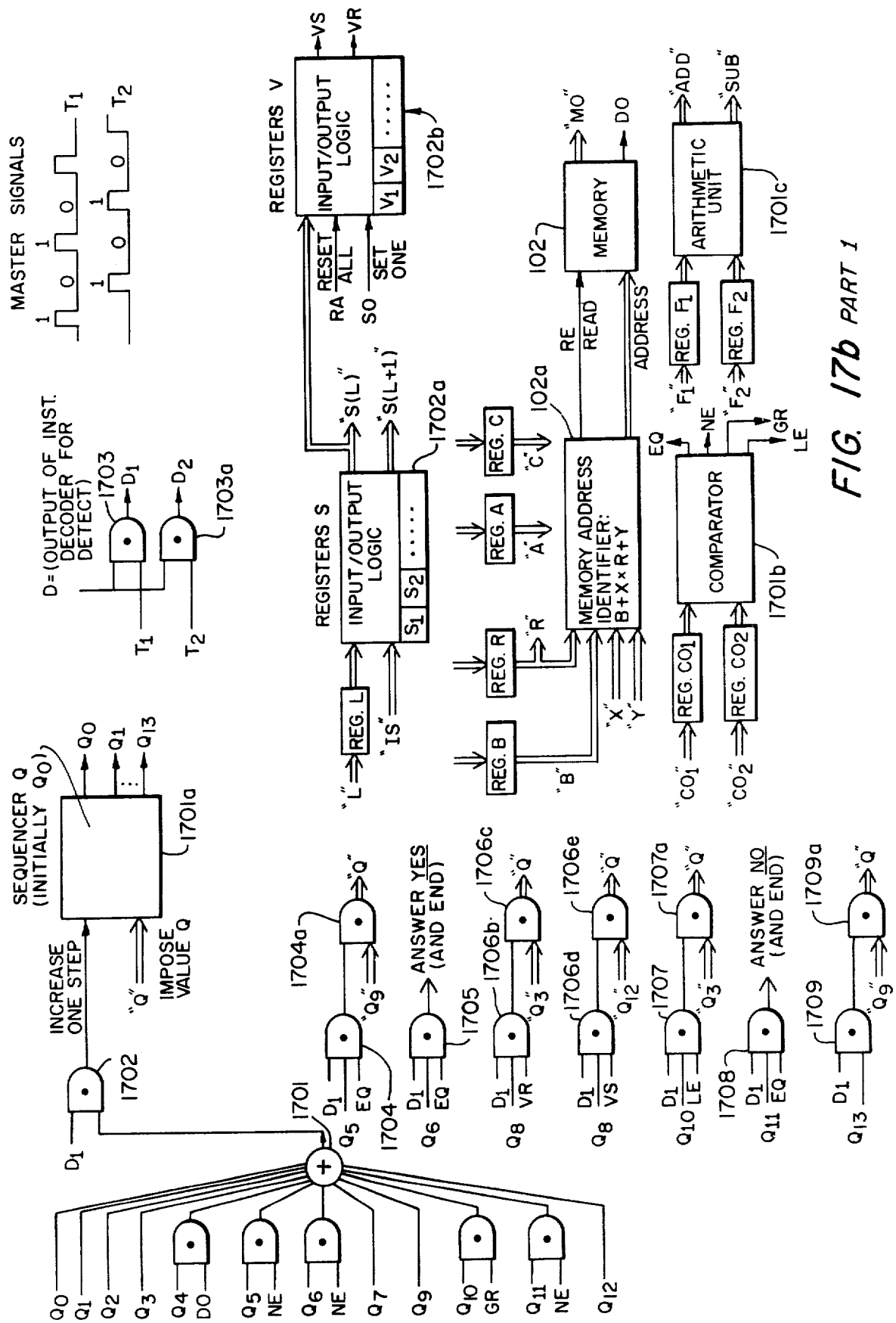
FIG. 17b PART 1

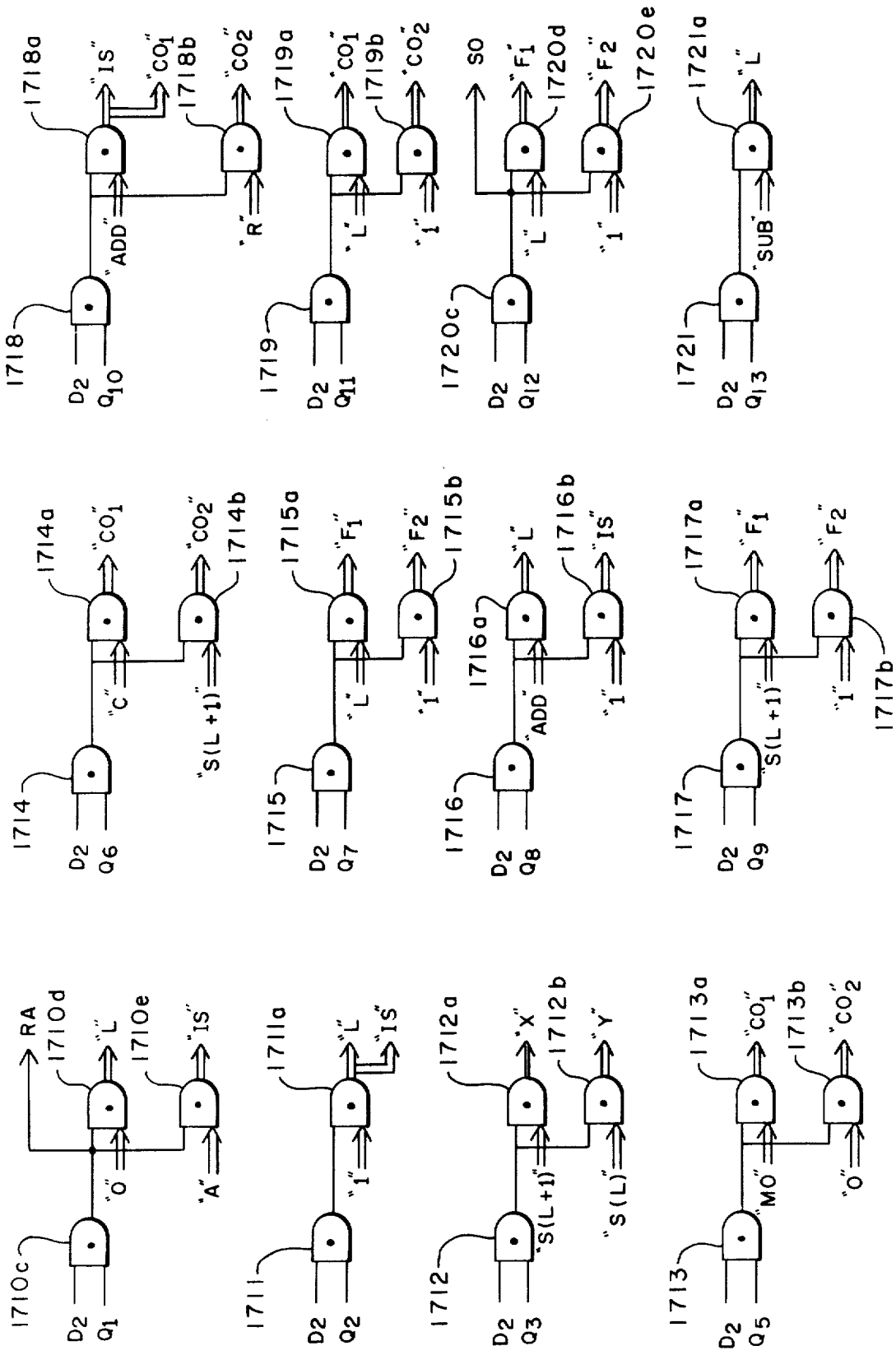
FIG. 17b PART 2

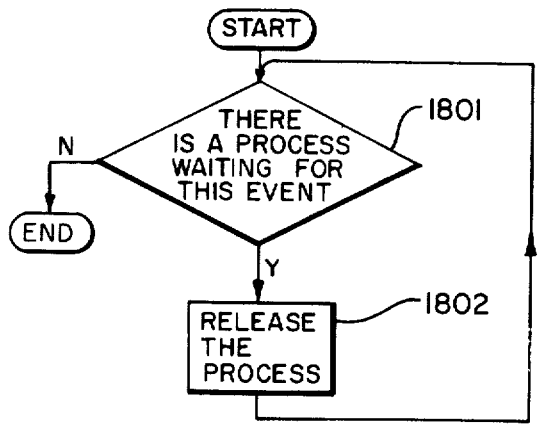
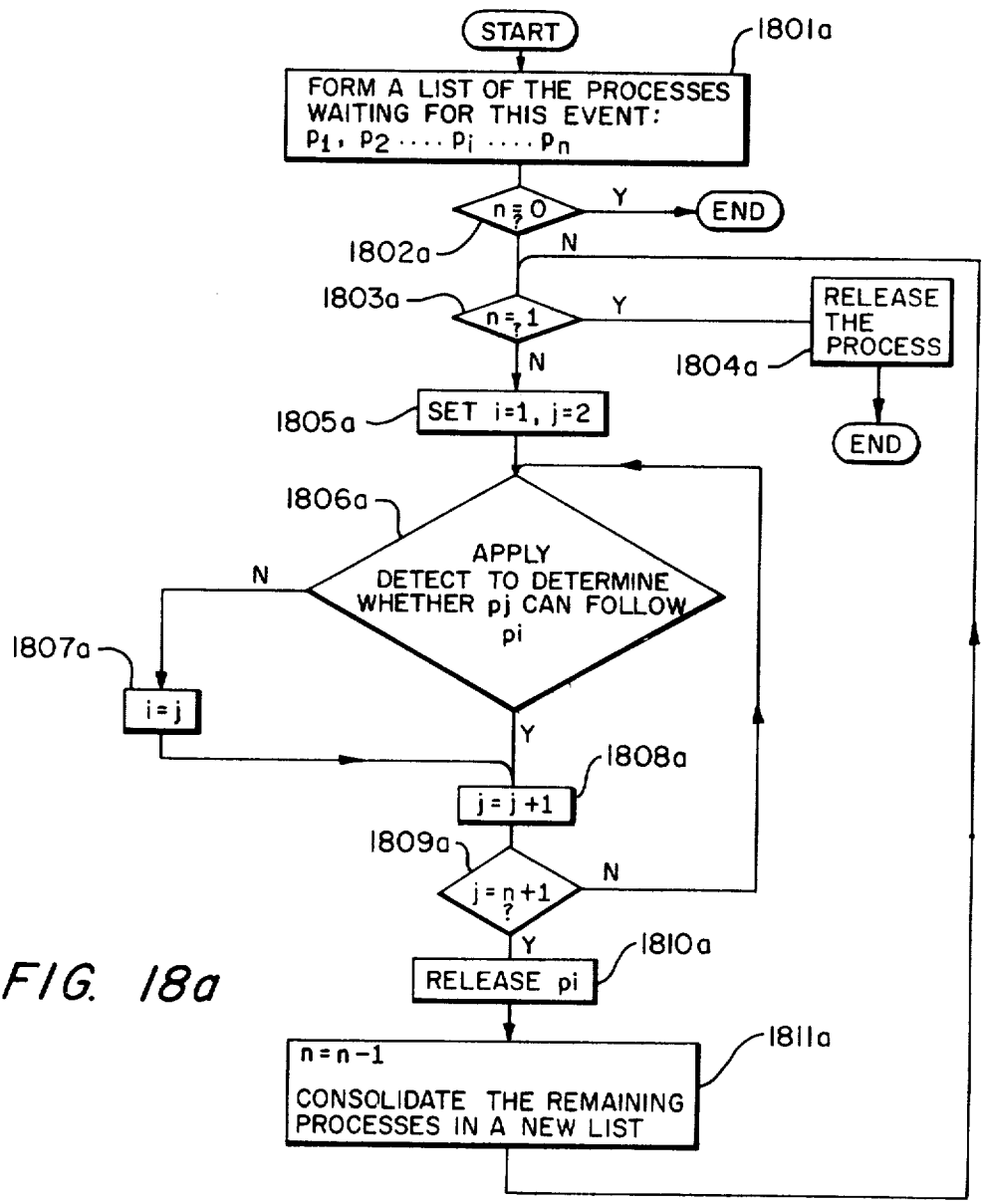
FIG. 18
FIG. 18a

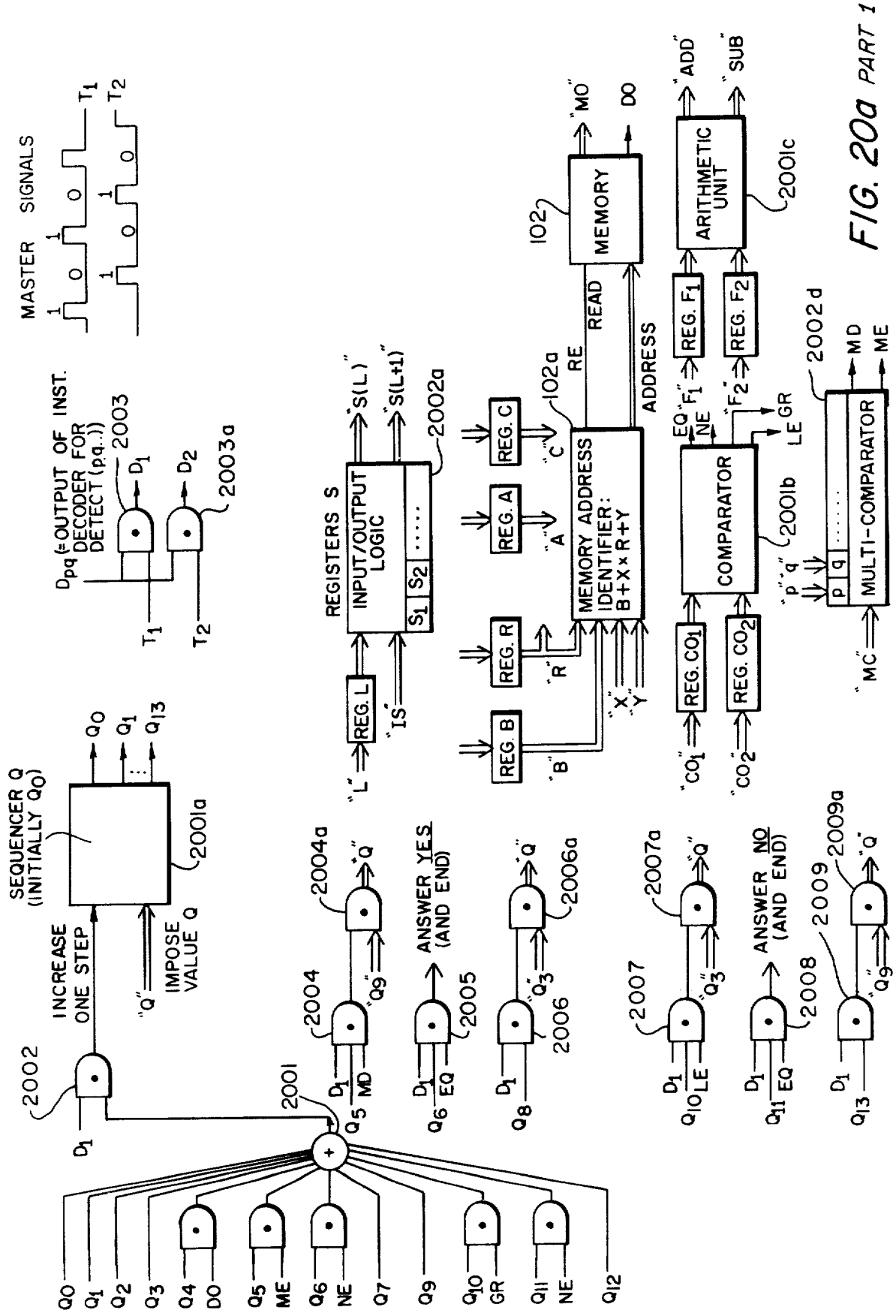
FIG. 20a PART 1

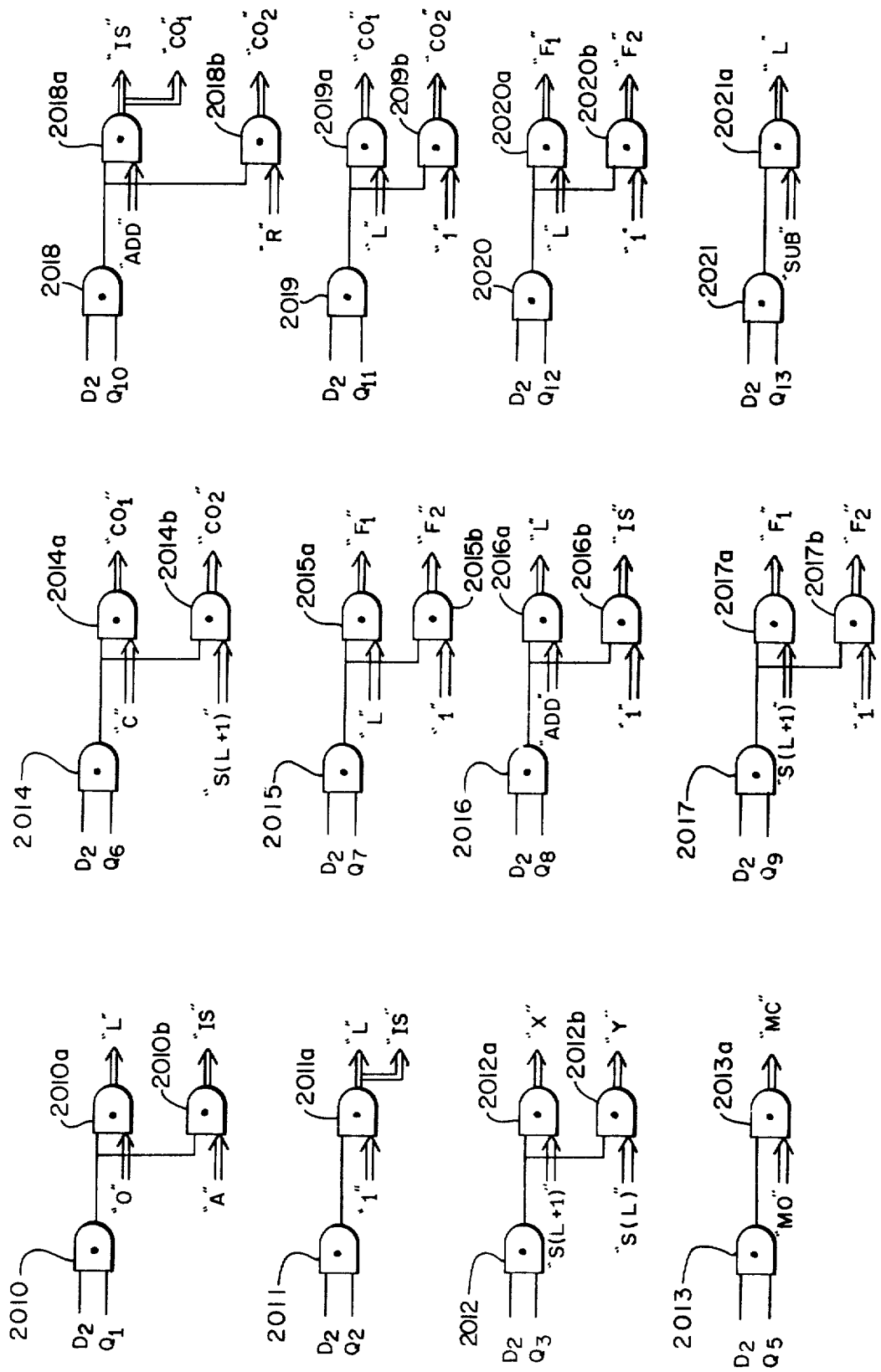
FIG. 20a PART 2

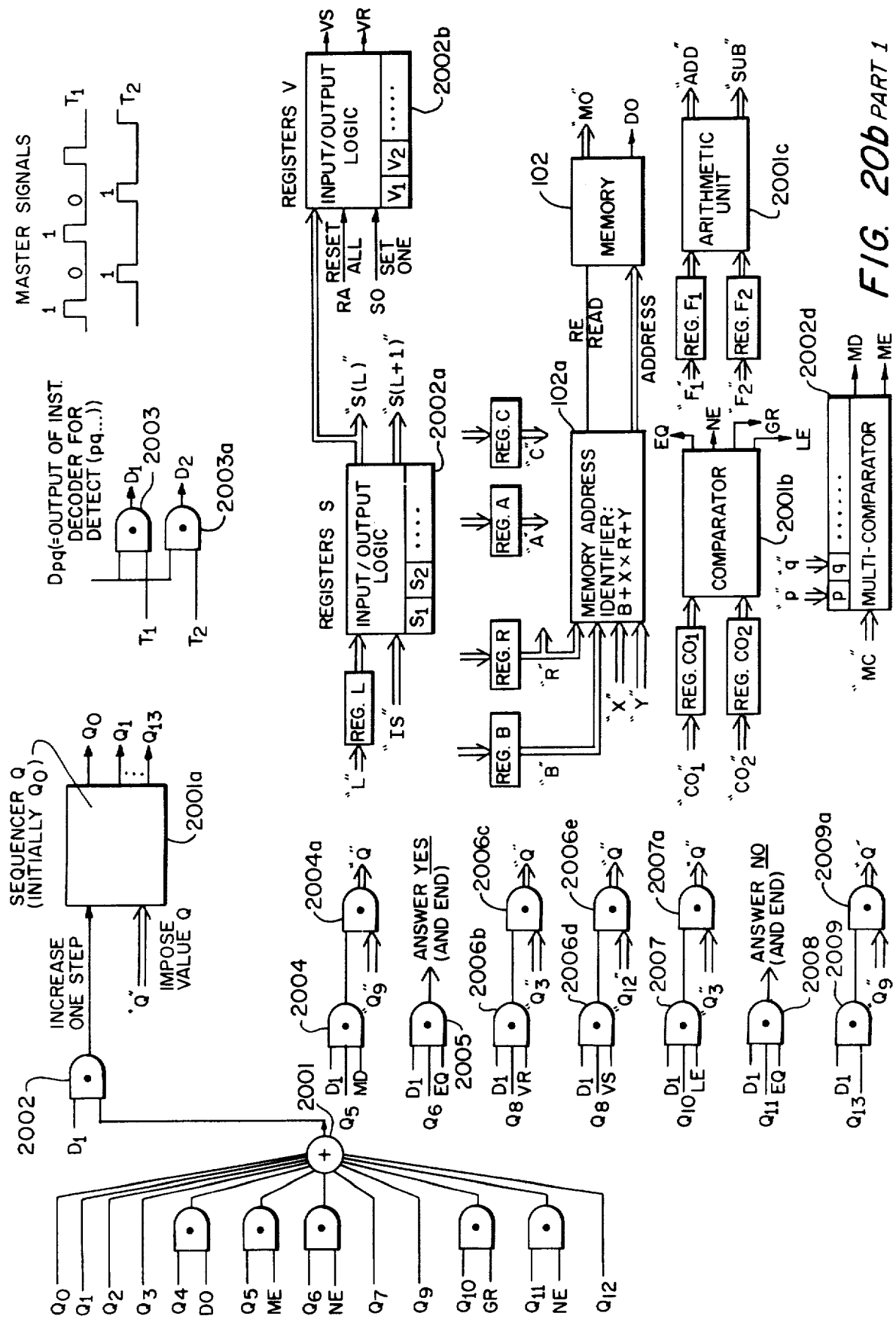
FIG. 20b PART 1

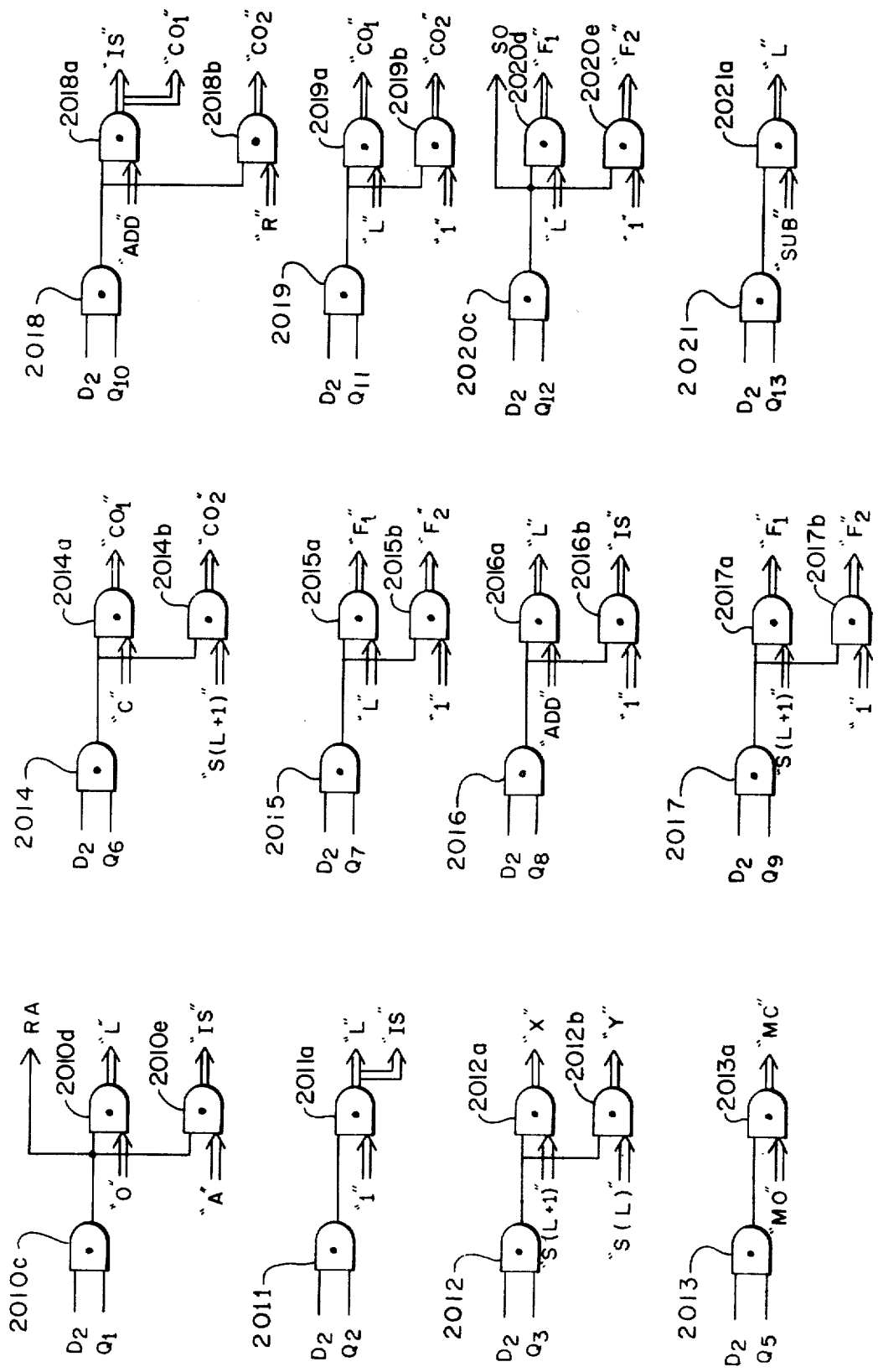
FIG. 20b PART 2

APPARATUS FOR DETECTING WHEN THE ACTIVITY OF ONE PROCESS IN RELATION TO A COMMON PIECE OF INFORMATION INTERFERES WITH ANY OTHER PROCESS IN A MULTIPROGRAMMING/MULTIPROCESSING COMPUTER SYSTEM

TABLE OF CONTENTS

Subject

Abstract of the Disclosure
Related Application
Background of the Invention
Objects of the Invention
Summary of the Invention
Brief Description of the Drawings
Environment
Description of the Problem
The State of Art
The New Approach
The Detection Mechanism
The Rules for Detection and the Principle of Interference
Consequences of the Basic Concept
Restoring Actions
Elimination of an Interference Loop
Elimination of Multiple Interference
The "Free Ride" Technique of Protection
The "No Dependency" Mechanism
The No Dependency Mechanism—Detailed Description
The General Protection Mechanism
Description of the Preferred Embodiments
   General Discussion
   Peripheral Subsystems
   Input/Output
   System Organization and Management
   Control Unit
   The Protection Mechanism
   The No Dependency Mechanism
   The Fundamental Check for Interference
Description of Flowcharts for Firmware and Hardware Embodiments of Detect
Software Embodiment of Detect
Firmware and Hardware Embodiments of Detect
Resuming the Waiting Process
The General Mechanism of Protection
The Generalized Detect
The Implementation of the Generalized Detect

RELATED APPLICATION

The following application is incorporated by reference to the instant application.

"System for Interference Protection" invented by Mario Trinchieri, filed on Dec. 30, 1974 and having U.S. Ser. No. 537,621 (now abandoned) and assigned to the same assignee as the instant invention.

BACKGROUND OF THE INVENTION

1. Field of the Invention

This invention relates generally to computer systems and more particularly to a system and method for controlling the interference due to the sharing of resources (data) in a multiprogramming/multiprocessing environment, both in local and distributed system architecture.

A resource is any element, such as a database, carrying information for use in a process. A record, a field in a record, a page of records and a message are examples of resources in this context.

2. Description of the Prior Art

Electronic computers have grown from first generation hardware characterized mainly by vacuum tubes, to second generation hardware characterized by transistors, to third generation hardware characterized, in the main, by integrated circuits. Along with these different generations of hardware there were different generations of software, wherein first generation software was characterized mainly by machine language, assemblers and subroutines, and second generation software was characterized by high-level languages, monitors and macro assemblers. Third generation software is characterized by operating systems, on-line real-time systems multiprogramming systems, and data management systems.

The first generation hardware in combination with first generation software, and also the second generation hardware in combination with second generation software were primarily oriented toward batch processing where jobs were executed one at a time. The third generation of hardware/software systems are also batch process oriented; however, because of the advent of multiprocessing, several jobs may be executed in parallel rather than serial and may compete for the utilization of the same database.

The fourth generation system will be capable of satisfying even higher parallelism among the activities. Real time operations, that impose constraints on response time requirements, and the necessity of adequate performance/cost ratios impose a multiprogramming/multiprocessing environment where the risk of interference among the activities is very high. Proper control of interactions among processes is vital. Some interactions are desired and planned, like the ones based upon the exchange of messages, but some are purely accidental and may derive from unplanned events, like the shared utilization of a record, and they must be carefully controlled. Hardware and software will cooperate in this operation to insure safety at the minimum overhead cost. The fourth generation system is also characterized by distributed system architecture, where processing and data are distributed among physically separated computer nodes.

Processing in the first generation hardware-software computer systems was relatively straightforward: for each job or transaction a program generally ran with little or no interruption until the job or transaction was completed. Many jobs such as the compilation and execution of a high level language program could and did run as a single uninterrupted process. In this context a process is a concept implying the execution of some activity and should not be confused with the concept of a program or procedure which is the description of an activity and can be used by one or more processes at the same time.

The concept of a process as the basic unit for a multiprogramming/multiprocessing environment is developed later. In such an environment many users are demanding service simultaneously and it is natural to conceive of multiple processes competing for resources within the computer system. Each process consists of the execution of a program (i.e. an ordered collection of instructions) on the basis of data and other pieces of information in order to perform a job or some part of that job. Where many such processes are demanding simultaneous attention from the system, the task of controlling and allocating resources (data) to such processes, particularly in view of the requirements of fourth generation systems, becomes extremely complex.

Generally the processes are controlled by an operating system which implements primitives issued by the process and enforces a general mechanism of control. The control for the sharing of resources can also be implemented as a separate entity.

At any rate, the conventional techniques of process control introduce only partially efficient mechanism of protection against interferences of one process from another. Beside being confined inside subsystems (the Database Manager in general) instead of considering the system as a whole, they operate in a conservative manner. They do not intervene when the risk of incorrect results is detected, but they enforce conservative limitations which allow only a few sequences of access that are known to be safe.

This way of reasoning has created methods based upon preassignment and locking of resources. This basic concept is the one of assigning a resource to one process user at a time, until completion of the process. More refined mechanisms limit this "exclusive" mode to the case where the resource is going to be modified by the process, and allow a "shared" mode of access to a resource when it is going to be "read only" by the process-users.

None of these mechanisms offers the maximum of accessability that could be theoretically granted, and present some inherent drawback, as unnecessary deadlocks, and/or may imply not trivial overhead.

These limitations did not stem out of lack of interest for an efficient manner of getting higher throughput from the system, but rather from an inadequate knowledge of the interference mechanism itself. What is needed for fourth generation systems is a firmware/hardware mechanism which efficiently controls or monitors the activities, provides processes with protection from other processes and allows high level of sharing and therefore of productivity.

OBJECTS OF THE INVENTION

It is a primary object of the invention to provide improved apparatus for the interference protection among processes in a multiprogramming/multiprocessing environment with local or distributed system architecture.

It is another object of the invention to provide a family of systems and methods for protection against interference and associated provisions against additional inconveniences like secondary aborts, excessive space requirements for temporary storage of uncleared version of the resources, etc.

It is a further object of the invention to provide a computer system with a family of hardware/firmware instructions designed to reduce overhead and increase efficiency in the implementation of the above-mentioned new systems and methods.

It is an additional object of the invention to provide mechanisms and/or a set of hardware/firmware instructions to be utilized in any environment or application where the requirements or the mathematical models are similar to the ones discussed in conjunction with the preceding objects.

SUMMARY OF THE INVENTION

The foregoing objects are achieved according to one embodiment of the invention and according to one mode of operation thereof by providing a data processing system with an organized set of recorded observations and a special type of instruction to operate on it, and executing a procedure that utilizes such instruction to ascertain the legitimacy for a process to utilize a resource (e.g. access a record). The request to utilize a resource for a specific operation can be approved and, in some instances, delayed or redirected or rejected. Rejection initiates appropriate restoring actions.

More precisely:

The mechanism of protection monitors every request issued by any process, observing the relationships (precedences) that the request implies if approved.

The relations are tested against the already approved and recorded relations.

If they fit into the preexisting picture the new relations are also approved and recorded. The request is therefore approved for immediate or delayed execution.

If they imply instead an absurdity i.e., a loop of precedences or equivalent inconsistency, the mechanism suggests the appropriate redirection of the request or a corrective action to take place.

Variations of the mechanism include the way the precedences are recorded, which information is assumed as a basis for the detection, the mechanism used to recognize the precedences and the formation of a loop among them or the existence of equivalent inconsistency.

Other main variations include the addition of collateral protections and the type of action that is suggested for recovery.

BRIEF DESCRIPTION OF THE DRAWINGS

FIG. 1 indicates the basic elements of the environment where the invention applies.

FIGS. 2, 2a, 2b, 2c, 2d, and 3 illustrate examples of interferences.

FIGS. 4, 5a, 5b, 5c, and 5d provide a graphical representation of relationship among processes.

FIGS. 6a and 6b present the Matrix of Relations (a tool for the invention) and a corresponding graph.

FIGS. 17a and 17b illustrate two hardware implementations of the DETECT instruction of the invention.

FIGS. 18 and 18a show a preferred embodiment of the releasing mechanism of the invention.

FIGS. 20a and 20b illustrate two hardware implementations of the DETECT (p,q . . .) instructions of the invention.

GENERAL DISCUSSION OF BASIC CONCEPTS

1. Environment

Figure 3:
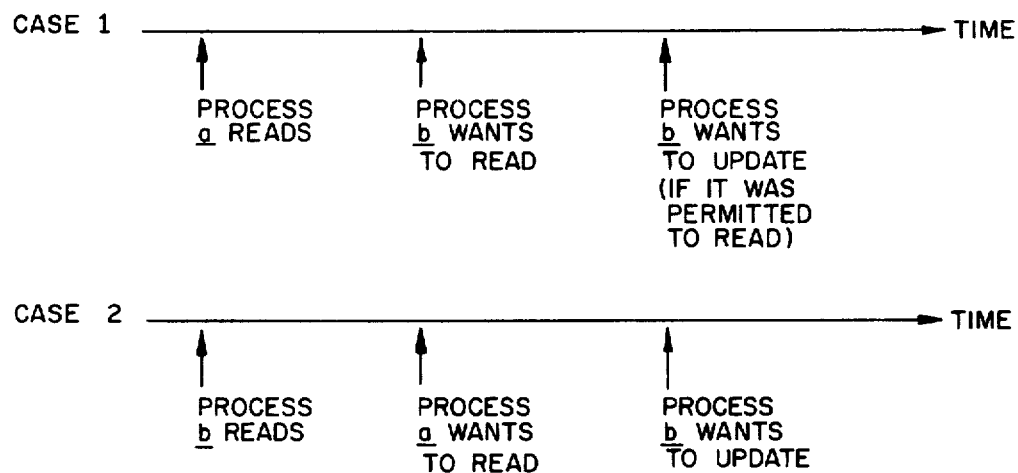

An environment is utilized (e.g. a computer system) where n independent activities (e.g. processes) are simultaneously executed. The activities may utilize (e.g. read or write) some out of m resources (e.g. database elements as records, pages, etc.) to perform their tasks.

The nature of the activities is such that if they were executed one at a time in any sequence till completion, the fact that a resource has been utilized by more than one activity is not an "interference".

The activities, i.e., processes, which are considered throughout the specification are independent, i.e., they may be executed in any sequence whatever in a uniprocessing environment.

When, instead, as in this environment, the activities are carried on with a degree of simultaneity, the fact that a resource can be utilized by more than one activity may lead to wrong results. The system, therefore, must offer the necessary protection against the occurrence of such an interference.

The theoretical nature of this interference has been disclosed by the inventor in a paper entitled, "On Managing Interference caused by Database Sharing", by Mario Trinchieri. (Published by Alta Frequenza, November 1975.)

This leads to an entirely new class of mechanisms of protection.

Here and in the referred to above, article the new concept of interference is described. The implementation of some leading apparatus of this new class is also presented.

2. DESCRIPTION OF THE PROBLEM

The basic elements of our environment are those indicated in FIG. 1. The Integrity System I.S. is the element where the protection mechanism resides.

To describe the problem let us first assume that the activities (we will call them processes, or more precisely process-phases, with reference to the computer environment) were executed one at a time. They will access some resources to read, write or update an information. Since one process is always terminated before another process is initiated, there is no interference among them. No mechanism of protection is required.

EXAMPLE

Process a accesses a record containing the balance (100$) of the account of Mister X, to read it. (Step 1). Then process a computes the new balance resulting from a withdrawal that Mister X performed (100−10=90$). (Step 2). Finally process a accesses again the record to update it, i.e. to write the new balance (90$) on it. (Step 3).

Process b, then, is activated which performs another operation (a deposit) on the same record of Mister X. It reads (90$) (Step 4), it computes 90+20=110$ (Step 5), it writes 110$ (Step 6).

Process a and process b do not interfere.

The sequence of events is illustrated in FIG. 2, Case A.

Another perfectly legitimate sequence of actions may be the following sequence: process b is executed first, and process a is executed second. Case B of FIG. 2. Let us now suppose that from the previous uniprocessing mode, we move into a multiprocessing mode: process a and process b are simultaneously active.

The interest for such a mode is dictated by the higher utilization of the system and therefore the higher throughput that can be achieved in general, provided a mechanism of protection against interference exists. To illustrate the risk of interference, let us consider again the example case.

Process a and process b both read the old balance before any update, perform their computations on this basis, and write down their conclusions. The first of the two writings (case C of FIG. 2) is overwritten by the second (as in any case must happen) but the final value is wrong.

The interference occurs because the two processes happen to operate on the same old balance. Since this event has only a marginal probability to occur, the simultaneity of operation is in general useful, provided cases like the above one are taken care of by a built in protection mechanism.

The interference that the example illustrates for the case of two processes and one record can involve in general any number of resources and processes in more or less complex patterns, as it will be discussed later. The mechanism of protection must be able to recognize any of them and provide for adequate actions.

3. The State of Art

The mechanisms of protection implemented so far are usually based upon locking or assigning resources to the processes. Their effectiveness could be explained on intuitive basis.

For instance: The resources needed by a process, if known in advance, are assigned (preassigned) to that process and made available to other processes only when the owner process is terminated. Alternatively, the resources are assigned to a process as soon as the need for their utilization by the process becomes evident.

In the example of the previous section (Case C), the resource, once first utilized by process a, would have been assigned to process a upon completion, and process b could have only waited.

These assignments and locking procedures can provide protection for multiprocessing environments; however they do not provide all the sharing capability that a system could afford, and they are not immune from other drawbacks.

To illustrate this point let us consider another example. Process a wants to read a resource; process b wants to read the same resource and update it. FIG. 3.

A method of "exclusive assignments" locks the resource to the process that first reads it. The other process cannot access it and has to wait until the first process is terminated and the resource released. This results in a loss of time for the waited process.

Another method can be devised that allows a resource to be in "shared read" mode or in a "shared read/exclusive write" mode.

This method will allow the first two reads and permit process b to write only when process a is terminated. This may or may not result in a delay of process b, depending upon the relative timing.

In any case the delay is unnecessary because the reading by a would not have caused interference.

The methods proposed (see next section) recognize this fact.

4. The New Approach

The basic idea is founded upon the observation that, by definition, there is no interference in a uniprocessing environment (see Section 2).

Therefore if we can assure that in a multiprocessing environment the resources are accessed by the various processes in a sequence that could have occurred in a uniprocessing environment, interference cannot occur.

In more formal terms, we may define an interference as "the occurrence of a sequence of accesses that could not have occurred in a non-shared (or uniprocessing) environment and that cannot be shown to be equivalent to one of them".

The addition of the "equivalence" clause derives from the fact that what really matters is not the actual sequence of accesses but the data involved in those accesses. In particular it is absolutely irrelevant that a resource is read first by a process a and then by b or the other way around, provided, of course, the resource had not been altered in the meantime.

To clarify this basic aspect, let us consider the example of Section 3. (FIG. 3).

The sequence of case 1 is typical of a uniprocessing environment, when process a runs first, followed by b when a is terminated. The sequence is considered therefore safe by the new approach, and the corresponding mechanism of protection permits it to happen without any delay for process b, no matter whether a is already terminated or not.

The sequence of case 2 cannot have occurred in a uniprocessing environment because either b had to follow a or viceversa. Nevertheless the new approach recognizes the fact that a would have read exactly the same values if a had read before b; that is, the new approach recognizes that the sequence of case 2 is equivalent to the one of case 1.

Therefore the mechanism of protection considers it safe and allows the accesses to occur without delay.

Let us now examine the cases illustrated at Section 2 (FIG. 2).

A sequence like the one of cases A and B is approved because it is consistent with a uniprocessing environment. A sequence like the one of case C cannot occur in a uniprocessing environment where only cases A and B are possible, nor can it be considered equivalent to case A or B because the data involved are different.

Therefore the mechanism intervenes in such a case C to protect the integrity of the results.

We have already examined the actions of conventional methods with reference to the example of Section 3.

The actions resulted in unnecessary delays.

It is interesting to note that in this case C of FIG. 2 their actions, instead, would have resulted either in a convenient delay of process b or in a deadlock (deadly embrace) situation if they had allowed both processes a and b to read. This latter situation (deadlock) arises from the fact that the resource, already assigned in a shared reading mode, cannot be further utilized by a nor by b to write: both processes get caught in a situation without a way out.

5. The Detection Mechanisms

It should be clear by now that whereas the conventional mechanism of protection operates by limiting the accessibility to the resources and therefore in general the throughput of the system, the new proposed mechanisms pose no limitation but continuously monitor the actual utilization of the resources and intervene only when they detect a dangerous pattern.

The detection mechanism is the key of these protections.

The basic concept has been presented in the previous section:

"an interference is the occurrence of a sequence of accesses to an information base by processes executing in the computer system that could not have occurred in a non-shared case i.e. where processes are executing sequentially and that cannot be shown to be equivalent to one that could have occurred in a non-shared case."

This concept is implemented by establishing which "precedences" in time among the processes are revealed by the actual sequence of accesses to the resources, and by rejecting the occurrence of a loop among precedences.

A loop of precedences is obviously absurd because it implies that a process precedes and at the same time follows another process.

To clarify this point let us consider again the examples of FIG. 2.

Case A reveals a situation where the actions of process a entirely precede the actions of process b. (See FIG. 2a). No loop. Actions are legitimate. Case B reveals an opposite but still legitimate sequence. (See FIG. 2b.)

Case C. Since process a writes on the resources after b reads it, it is obvious that, up to that moment, the precedence "b precedes a" has been established. (See FIG. 2c.)

As soon as process b tries to write on it, the additional relation "a precedes b" must be recognized and added to the diagram. (See FIG. 2d.)

This would create a loop that cannot be tolerated by the mechanism of detection because of its absurdity.

Figure 4:
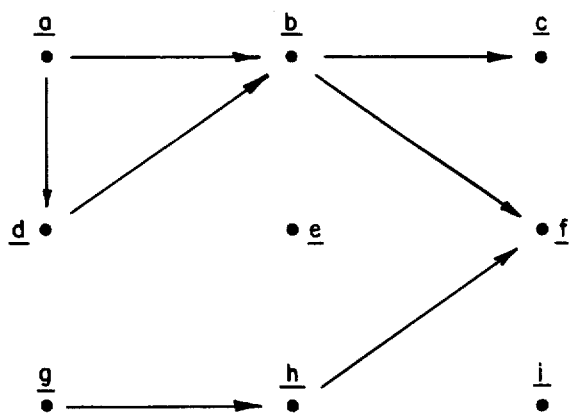

The example refers to a two-process, one-resource situation. The general case deals with n processes and any number of resources. The corresponding diagram has one node per process (FIG. 4) and continuously evolves reflecting the activity in the system.

Some nodes can show many relations, some can have no relations at all.

A variety of mechanisms of protection can be built around the basic concept. Some implementations have been described in an article by the inventor entitled "On Managing Interference by Data Base Sharing" and published in ALTA FREQUENZA, N. 11, Volume XLIV-1975-da, page 351E-641A, page 360E-650.

They all share a common feature: the search for a loop or equivalent contradiction.

6. The Rules for Detection and the Principle of Interference

Figure 5A:

In the example of the previous section the precedences were introduced on a rather intuitive basis. The rules upon which precedences can be established can be described as follows:

When a process a reads a resource that was written by a process b, the time sequence "a follows b" is noted. (See FIG. 5a.)

Figure 5B:

When a process a writes a resource that was previously read or written by a process b, the time sequence "a follows b" is noted. (See FIG. 5b.)

When a process a reads a resource that was previously read by a process b, the time sequence "a follows b" is not noted because the results do not change if the time sequence is reversed.

Based upon these rules an unacceptable event is: an event that contradicts previously established time relations, namely: an event that closes a loop. (See FIG. 5c.)

In a more formal way the principle of interference is as follows:

"When independent processes, simultaneously executed, share resources (e.g. data),
a process that reads a resource is said to follow the process that wrote it.
a process that writes a resource is said to follow the process that read or wrote it.
If the set of precedences so established forms a loop, an interference has occurred that involves the processes joined in the loop."

It may be useful to note, for any practical implementation of the new concept, that it makes the mechanism of protection more advanced but not necessarily more complex. As a matter of fact the application of the concept requires to list the
processes-users in the system and
the type of use (read/write), for each resource (each list contains only the non already cleared processes)

This information is fundamental to any mechanism. Obviously, mechanisms that allow very limited sharing have degenerated or very short lists.

The detection of the precedence loop, that is peculiar of this new class, is not by itself more complex than a correspondent detection of deadlocks, necessary in conventional mechanism.

As a matter of fact the new class can be implemented via the embodiment of a new introduction, one macroinstruction or a small sequence of instructions, in software, firmware or strictly hardware, depending upon the desired degree of tradeoff between hardware and software.

For a generalized interpretation of the new concept it is useful to note that the expression "a process reads or writes a resource" applies to any activity that operates on a resource deriving information without altering it, or adding information and altering it.

7. CONSEQUENCES OF THE BASIC CONCEPT

The basic concept provides a basic understanding of the interference phenomenon and puts in a unique light all the mechanisms for controlling shared accesses to the resources. It may be used both to suggest a new mechanism and methods of protection and to check the validity of the existing ones.

A protection mechanism is a system capability that permits the simultaneous execution of processes that have been conceived as if they were executed in a uniprogramming environment where the risk of interference is absent.

Two basic approaches can be followed to provide the necessary protection apparatus:
1. Allow free access to the resources, but monitor the actual sequence of operations.
2. Put properly chosen limitations on the freedom of operations so to exclude unwanted patterns.

To these two, a third class of solutions must be added:
3. Combine the monitoring of the first approach with the impositions of restrictions as in the second.

Absence of a general criterion on how and what to monitor suggested the second approach for the conventional methods (assignment or locking methods). The basic concepts of interference provides the monitor for the first and the third approaches. As examples of the first and third approaches (the new methods) we indicate the "Free Ride" (a Shared Read/Shared Write method) and the "No Dependency" (a Shared Read/Exclusive Write method), described herein infra.

It is important to note that the imposition of restrictions, typical of the third class, leads to the introduction of the "Wait" status as a possible outcome of the mechanism, beside the approval for continuation or the order for a restoring action.

The third class encompasses the first which becomes a sort of subclass.

It is therefore to this (third) class that the invention to be taught infra mainly refers. The class, in its broad definition, includes any combination of the monitoring action with the imposition of extra restrictions for whatever reason.

The principle of interference establishes the correctness of a "go ahead"; the additional restrictions may operate to reduce recovery, space requirement, etc. The "No Dependency" is a special case of this class and is discussed in section 10. The general case is presented at section 11 and later on.

8. RESTORING ACTIONS

To discuss a protection mechanism completely, it is necessary to describe also the course of action that the mechanism follows when an interference occurs.

Assuming that the last access, the one that closes the interference loop, has not yet been actuated, there are two possible alternatives:
1. Avoid that access.
2. Eliminate some time relations so as to avoid the interference loop.

The first alternative does not mean to change the request issued by the process, which would imply a capability that we generally cannot expect a process to have. It means to satisfy the request with a different access. This is the case of a request to read. If it is possible to access a previous version (edition) of the same resource, the nonacceptable time relation is reversed and becomes acceptable (solid line $P_1 \rightarrow P_2$ of FIG. 5d instead of dashed line $P_2 \rightarrow P_1$). The reader, which was not allowed to "follow" the writer of a certain version, is now requested and allowed to precede the same writer.

Note that this "historical" reading, although highly desirable, is not a feasible solution in certain areas of implementation.

The second alternative is implemented by aborting one or more processes. Various methods can be suggested to decide which process or processes to abort, since more than one solution is generally possible. The next two subsections propose and discuss very simple methods offering a quasi-optimal solution and more sophisticated algorithms.

Elimination of an Interference Loop

Let us establish some basic points for the discussion.
1. We assume that a previous edition also called a "before" edition of a resource is saved when a process first modifies it and is kept until the process that modified it has been cleared. A process could be cleared when it is successfully terminated and all the processes on which it depends have also been cleared. Since it may have interfered with some other process and we want to retain the option of aborting it, if convenient, we prefer to clear a process "when it is successfully terminated and all the processes it follows have also been cleared." It should be noted that a stack of previous editions can exist for a resource. Therefore the system can abort selected processes and restore the modified resources. Lack of this capability would have required indiscriminate rollback of all processes and resources to some convenient checkpoint.

2. To eliminate an interference it is immaterial which process or group of processes is aborted (primary aborts), provided the suppression opens the loop.

3. Primary aborts may cause other processes to abort (secondary aborts) if the validity of the latter processes depends upon the correct termination of the former.

4. The damage associated with the abortion of different processes may be judged to be different and a figure of weight defined for each process, based upon such factors as the number of resources that have been modified, the existence of messages already exchanged with the external world, priorities, and so on.

It is now obvious that the following method can be proposed to eliminate an interference loop:

1. Any process or group of processes which when aborted opens the loop is considered a candidate.
2. The dependent processes are identified for each candidate.
3. The figures of weight for each candidate and its dependents are added up.
4. The minimum weight identifies the optimum candidate.

An alternative to this method is the following very simple rule:

"If a request cannot be granted because it implies the relation "$p_1$ follows $p_2$" whereas $p_2$ already follows $p_1$, the process $p_2$ and its dependents abort."

The rationale for this method is very simple: First, the abort of $p_2$ is sufficient to open the loop. Second, it is highly probable that $p_2$ causes a low number of secondary abortions, close to the minimum, because $p_2$ is the last process in the identified interference loop.

The rule is very attractive because the lack of computations and bookkeeping is likely to outweigh the advantages of a possible better choice offered by a more sophisticated method.

With this method the entire policy for the restoring activity can be summarized in the following statement:

"If a request for a resource implies a relationship "$p_1$ follows $p_2$", whereas $p_2$ already follows $p_1$, and a previous version of the resource cannot be used to circumvent the problem, $p_2$ aborts with its dependents."

Elimination of Multiple Interferences

If a request implies more than one relation that cannot be granted, the restoring procedures indicated above can be used to eliminate the interferences one at a time. Nevertheless it would be wiser to consider the problem in its entirety to optimize the overall course of action, rather than to suboptimize it.

The method based on minimum weight would in this case to examine as alternative candidates those groups of processes which, when aborted, open all loops of interference. The optimum candidate is the group which totalize the minimum weight. The method is feasible but onerous. To reduce computations and bookkeeping, a simple rule is even more important in this case than for the single interference. The rule is the following:

Two candidacies are considered. The first candidacy includes the requesting process and the processes that depend upon it.

The second candidacy is the list of all processes ($p_j$) which appear as second terms in the rejected relations ($p_i$ follows $..p_j$), plus the processes which depend upon them.

If the first candidacy includes fewer processes than the second, the requesting process and its dependents are aborted, otherwise the processes in the list are aborted.

A refinement of this rule considers an intermediate additional step of "minimization" of the list, before the final decision is taken:

Each process in the list is selectively tested to ascertain whether its abortion and the abortion of its dependents cures not only the interference of its "direct pertinence", but other interferences as well. When this happens other processes can be eliminated from the list, which is so reduced to a minimum.

9. The "Free Ride" Technique of Protection

The "free ride" approach belongs to the first class of methods described in Section 7 above, and can also be called the shared read/shared write approach since all resources can be shared for both reading and writing purposes until the monitor, applying the principle of interference, signals the need to change the course of action.

The mechanism can be summarized as follows. (For a complete description, see the Appendix I in the previously referenced paper.)

1. Each resource keeps note of its users and the type of usage (i.e., Writer name, Reader 1 name, Reader 2 name, ...).

2. When an access is granted, the mechanism memorizes in its private records those relations that apply to the specific access according to the rules:

a. A request to read implies that the requester "follows and depends upon the writer" of the requested version of the resource. The "dependency" is added to the "time" relation to form the composite "follows and depends" statement so that the mechanism has not only the information necessary, i.e., the time relations, for the interference check but also the information necessary to identify the processes that have to abort (secondary aborts) when another process aborts (primary abort).

b. A request to write implies that the requester "follows and depends upon the writer" and "follows and does not depend upon the readers" of the requested version of the resource. (It should be noted that a "does not depend" version of the mechanism is possible but is less convenient.

3. Any request to access a resource has to be approved by a mechanism which checks that either the implied relations have already been accepted and memorized on another occasion or that they can be accepted because they do not close some of the preexisting relations in a loop (principle of interference).

4. If the request fails the check:

A read is rerouted to a previous version of the resource. Check is repeated until the appropriate version is found. The occurrence of the access and the new relations implied if any will be regularly memorized.

b. A write causes the abortion of the intruder(s) and its (their) dependents; then the activity is resumed.

(1) "Intruders" are the processes the abortion of which is suggested by any of the rules described in Section 8 to eliminate the identified interferences.

(2) "Dependents" are all processes so revealed by the chain of relations "follows and depends" previously recorded by the mechanism.

The invention is a straightforward practical application of the criteria discussed so far. Its main advantages over the conventional techniques are that it allows maximum sharing of resources by eliminating the wait status, and reduces the cases of interference to be cured by abort to a level well below the one of "deadly embraces" for the same operative conditions. Deadly embrace (deadlock) occurs when the owner(s) of the desired resource is (are) also waiting for another resource and so on in a closed loop.

This last, very important, aspect results from the use of historical readings that may solve, without abortions, situations that would have caused deadly embraces in a conventional protection mechanism.

10. The "No Dependency" Mechanism

This mechanism belongs to the third approach indicated in Section 7 for a protection mechanism.

The rationale for its existence is the desire for additional features: (1) to restrain abortions and (2) to curb the amount of storage required for the non-cleared versions of the resources that are modified by the processes.

This mechanism offers some of the inherent capabilities of the free ride, but avoids secondary aborts and limits the storage to one "historical" version at most per resource. It combines the rules of the free ride with the additional restriction that only the time relations associated with a nondependency are allowed ("follows but does not depend").

The resulting approach has the following characteristics:

1. Each resource can have at most one version in a non-cleared status, i.e., whose creator has not yet been cleared.
2. A request to read a resource is addressed to the last cleared version of the resource, unless the requester itself has created a new edition of it.
3. Read and write requests must pass the principle of interference test.
4. Wait status is possible.
5. Interference causes primary aborts alone.

It is interesting to note that assignment rules alone could not create the same mechanism. The detection test is necessary because the interference paths can be very complex.

10.1. The No Dependency Mechanism—Detailed Description

This subsection explicitly refers to the phases, or steps, of the processes, since this description is implementation-oriented. A phase indicates specifically any part of a process which requires that the database and any other source of information appear unchanged by others during the execution of that part and until completion. Obviously, the subdivision of a process into phases can ony be made by the creator of the process procedures, i.e., the programmer, or by other equally knowledgeable persons.

The whole process is assumed by default as a phase and there is no obligation to declare any existing finer subdivision of it, but a subdivision into phases is convenient to reduce the probability of interferences and the actual bookkeeping of the mechanisms of protection.

Throughout the specification, with the exception of this subsection as an example, the term process is used for simplicity instead of the more specific term process-phase to name the entities monitored and cured by the mechanisms, it being understood that the mechanisms of protection apply equally well to any level of subdivision of the processes declared by their creators.

The hypothesis is that independent phases of various processes run simultaneously, sharing a database, and that each process has been programmed as if it were alone in the system. The mechanism provides the required protection against interference.

The basic information that the mechanism maintains in order to fulfill its purpose includes:

1. The identity of the users (process phases) and the type of usage i.e., "Reader 1 name, Reader 2 name, . . . , Writer name" for each resource for which at least one user is still in the non-cleared status.
2. The updated figure of weight of each process phase, unless the simplified rules of recovery are adopted see Section 8.
3. The relations noted among the process phases, running or terminated, but still not cleared. These relations are here supposed to be organized in a matrix with one row and one column for each process phase. Equivalent tools can be used for the same purpose (lacunar matrix, graph, etc.). Theoretically the record of these relations is not needed because they can be derived repeatedly from the Writer/Readers strings mentioned above. However, this would slow down the mechanism. Each element of the matrix (FIG. 6a) indicates that:
    a. No relation has been noted (symbol 0), or
    b. Process phase in the row follows but does not depend upon process phase in the column (symbol 1), or
    c. Process phase in the row follows and waits for the termination and clearance of the process phase in the column (symbol 3).

Every time there is a request to access a resource, the mechanism has to approve it. The mechanism operates as follows:

1. First it identifies any relations implied by the request, if any,
    a. A request to read, addressed to the cleared version, implies a relation if there is a successive non-cleared version of it: its writer "follows but does not depend" upon the reader.
    b. A request to write implies that the requester "follows and waits" for the writer of the non-cleared version of the resource, if there is already a non-cleared version of the resource, or "follows but does not depend" upon the readers of the resource, if there is not a non-cleared version of the resource. If the writer or a reader is the same as the requester, no relation is noted. This means that the detection mechanism is invoked only in those situations where a conventional assignment method would have denied the access and initiated a check for deadly embraces. This substantiates the statement that overhead is not bigger here than with conventional methods.
2. Each relation identified above, is checked against the matrix to see if it has already been noted to this extent symbols 1 and 3 are considered equivalent, since the check is looking for time relations only.
3. It the relation is not in the matrix, it must be established whether its introduction in the matrix would close a loop. The check is simple:
    a. Consider the process phase that appears as the first term ($p_1$) in the relation ($p_1$ follows $p_2$) to be tested.

b. Examine the corresponding column in the matrix.

c. For each element of the column that carries the symbol 1 or 3, consider the corresponding process phase, head of the row.

d. For every process phase so identified, execute recursively steps (b), (c) and (d) until exhaustion of all branches or until process $p_2$ is found.

e. Exhaustion means that the relation is acceptable; encounter with process $p_2$ indicates instead the formation of a loop.

4. If the request to access the resource does not imply any relations or the relations already exist in the matrix or they can be safely added to it, the request is approved.

If the request is approved, the mechanism updates its records (matrix, etc.) and either the operation continues as planned, or, if it requires to write on a resource that has already a non-cleared version, the process enters the wait status.

If the request is rejected, the following course of action is taken:

1. Wait for the non-cleared version, for a read request. If a read cannot utilize the cleared version of the desired resource, but must be addressed to the non-cleared version, the reader enters the wait status. The mechanism will update its records accordingly.

2. Abortion for a write request. According to the simplified method discussed in Section 8 for the case when only one relation opposes the request, the process-phase that appears as the second term in the rejected relation aborts (no secondary aborts exist). Instead, when more than one interference exists, the simplest method of Section 8 suggests the abortion of the requester itself. Alternatively, if the application justifies it, the optimum candidacy for abortion is identified with one of the more sophisticated methods, also discussed in Section 8.

When a process phase is terminated and cleared or aborted, the matrix of relations indicates the process(es), if any, waiting for this event. The processes can now resume their course, monitored by the mechanism of protection. To avoid unnecessary causes for possible abortions, the mechanism will resume the waiting processes in a sequence that respects the time relations existing among these processes.

The mechanism, as the free ride, is "continuous" in the sense that at any moment a new process phase can enter or leave the system, having been regularly cleared.

A final observation: It is rather obvious how a similar organization can also take care of the general case, where time relations, dependencies, wait statuses are monitored by the mechanism of protection.

11. The General Protection Mechanism

Figure 7:
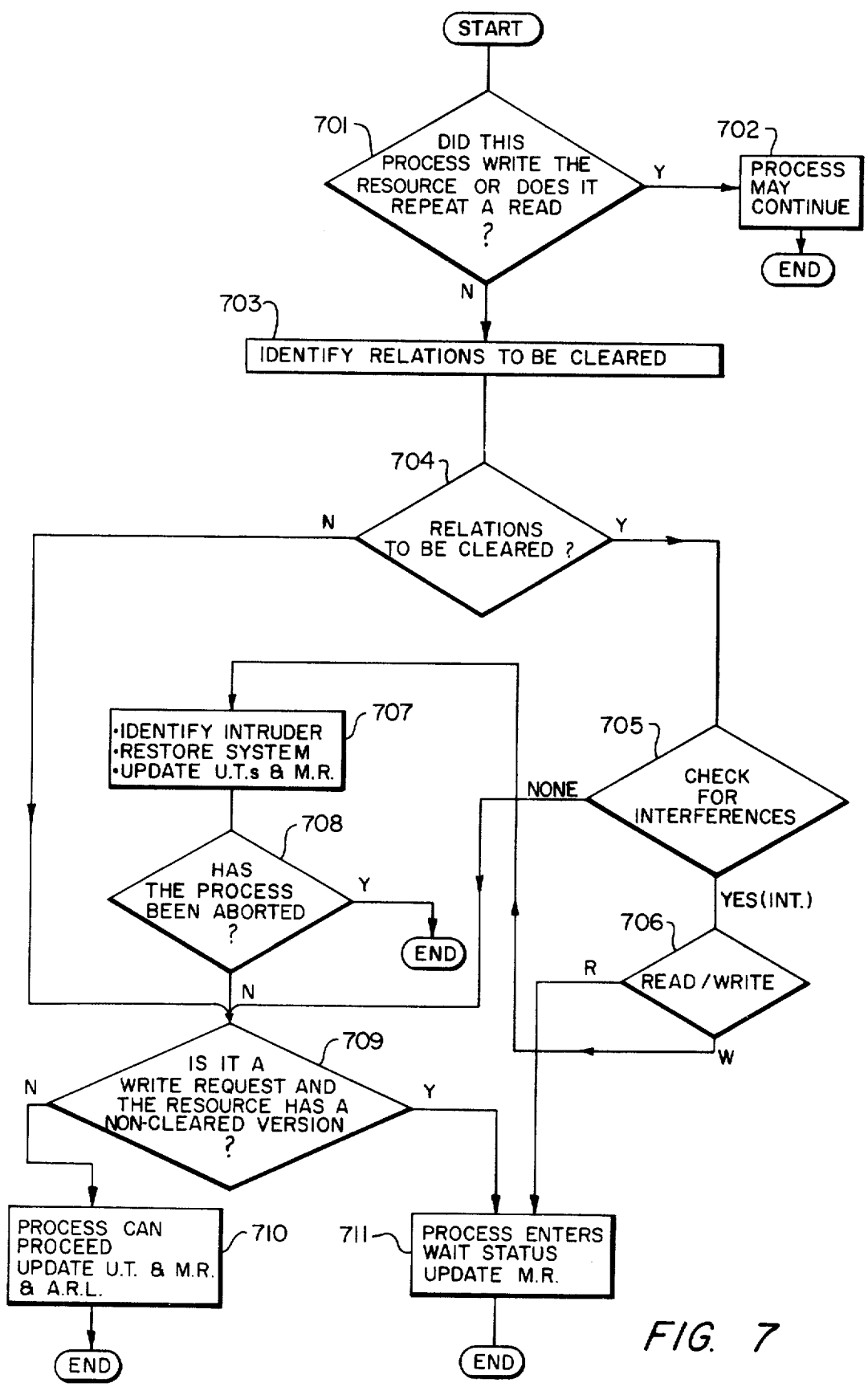
FIG. 7 shows the "No Dependency" mechanism of protection, a preferred embodiment.

The mechanism, that in the No Dependency method intervenes whenever a process attempts to access a resource, can be described as in FIG. 7.

The various diamonds and boxes correspond to the operations examined in the previous Section 10. In particular the WAIT status is imposed when the access, perfectly legitimate as far as interference is concerned, would cause a "dependency".

Figure 8:
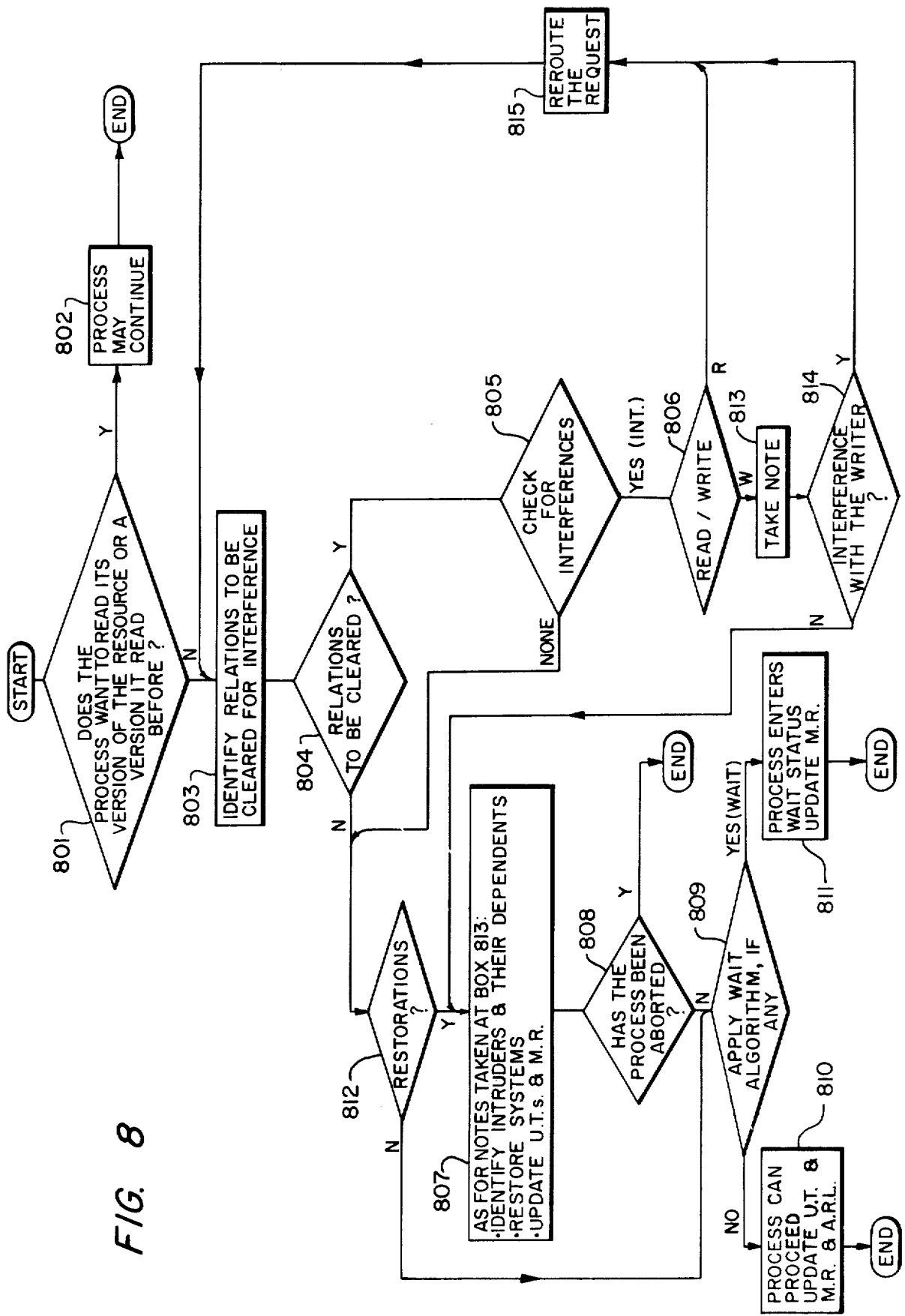
FIG. 8 shows the generalized layout of the mechanisms of protection based upon the invention.

FIG. 8 shows a generalization of the case, where the cause for a WAIT status can be any reason whatsoever.

The details of both FIGS. 7 and 8 are discussed later on, when the preferred embodiments are presented.

To complete a general mechanism of protection, the release of the processes from the WAIT condition must also be provided. This additional mechanism, being complementary to the one that puts the processes into that status, can be better described on a case by case basis.

Anyway the release mechanism that is valid for the No Dependency is fairly general and applies to all cases where a waiting process is to be resumed when another is terminated and cleared or aborted. In these cases the Matrix of Relations indicates which processes are waiting for this event. The processes can be resumed, one at a time, in a sequence that respects the relations existing among the processes. Each release is monitored by the mechanism of protection. The details of a mechanism that implements these concepts will be discussed later on (RESUMING THE WAITING PROCESSES).

Note that our discussion on the general mechanism explicitly refers to the imposition of a Wait. As a matter of fact other impositions, like a Reject, could have also been considered. Although we recognize here that our concept of a general mechanism includes any additional restrictions whatsoever and not only the ones that lead to a Wait status, we will continue to explicitly refer to a Wait as the most representative and likely to occur. It should be noted that rejections for security, privacy etc. are most reasonably applied before the mechanism is called into action.

DESCRIPTION OF THE PREFERRED EMBODIMENTS

General Discussion

Figure 9:
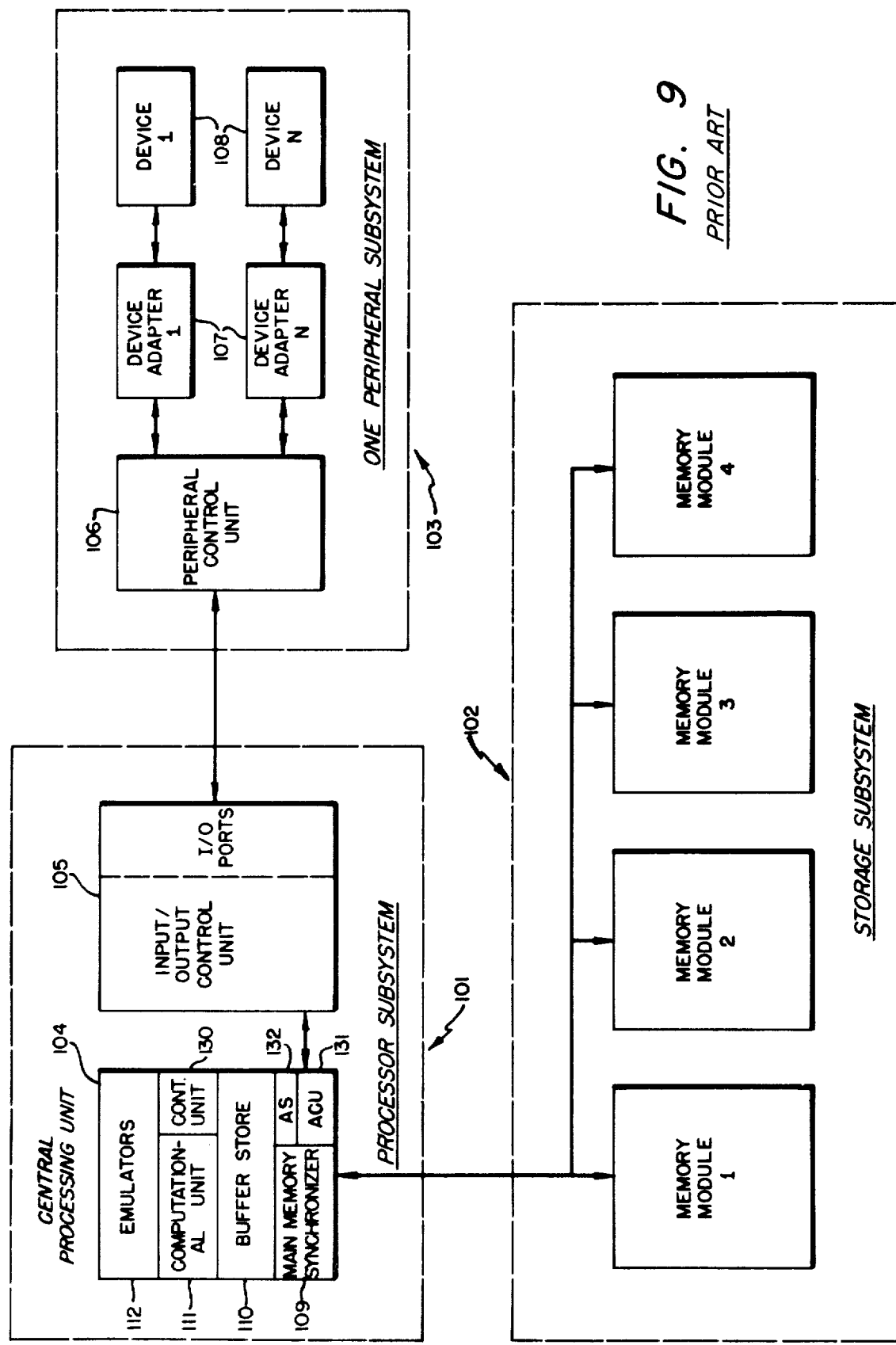
FIGS. 9, 10, 11, 12 and 13 show the basic components of a computer system and details of various prior art subsystems utilized by the invention.

The invention operates typically in a hardware system environment similar to that of FIG. 9 which is a block diagram of the Honeywell Information Systems Inc., Level 60 computer system and more particularly Level 64. Referring to FIG. 9 the subsystems are the processor subsystem 101, the storage subsystem 102, and the peripheral subsystem 103. The processor subsystem contains a central processing unit (CPU) 104 and the input/output control units (IOC) 105. Each peripheral subsystem consists of a peripheral control unit (PCU) 106, a number of device adapters (DA) 107, and peripheral I/O devices 108. The storage subsystem 102 comprises semiconductor memory modules.

The central processing unit 104 includes a main memory synchronizer 109 connected with the storage system 102, buffer store 110, a computational unit 111, and emulators 112. In addition, the central processing unit 104 also comprises a control unit 130, an address control unit (ACU) 131 and an address selector (AS) 132.

One or more of each of these subsystems coexists in the system and may be connected in any of the conventional ways. Typically, the connections, when there are more than one subsystem per type, are via a bus or a crossbar in a unisite implementation. In a multisite (multinode) or distributed implementation (distributed system architecture) communication subsystems and a communication network is also utilized.

The typical environment where the invention operates is one where the above outlined hardware, no matter if in a unisite or a multisite architecture and no matter if described as a large, medium, small or mini system, is utilized under the control of an Operating System that implements a multiprocessing and/or multiprogramming mode of operation. A multiprocessing mode needs a multiplicity of processor subsystems, whereas a multiprogramming mode may be implemented also in a uniprocessor system. In both modes a process is initiated before another process is terminated, and more than one process is simultaneously "alive".

Figure 10:
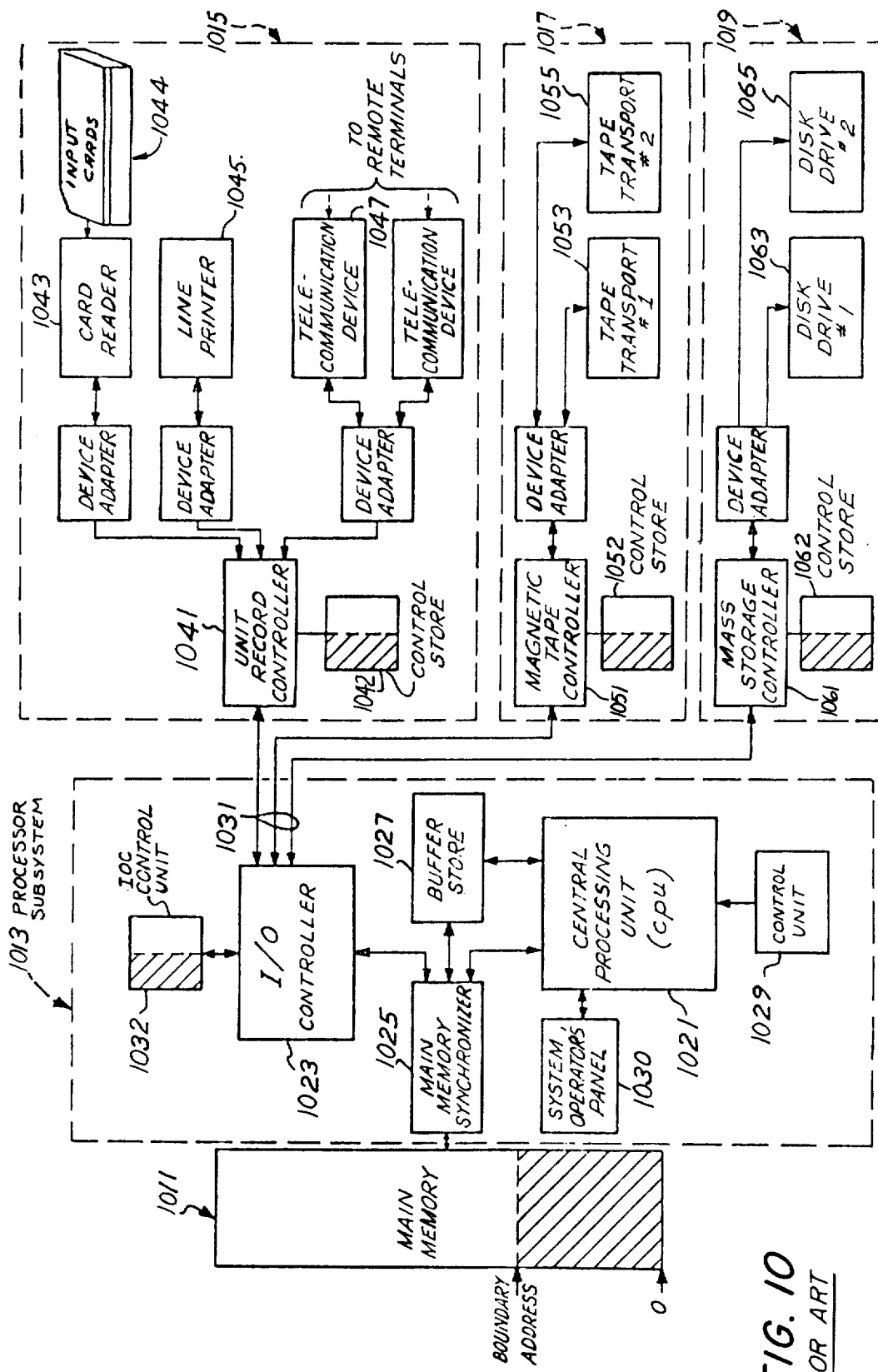

The computing system shown in FIG. 10 is a more detailed diagram of the Honeywell Level 64 computer system and is composed of several coordinated hardware subsystems. These subsystems are: a main memory storage subsystem 1011, a processor subsystem 1013, and three peripheral subsystems 1015, 1017 and 1019.

The processor subsystem 1013 contains a central processing unit (CPU) 1021 and an input/output controller (IOC) 1023. CPU 1021 performs the basic processing operations for the system while the IOC 1023 controls all information exchanges between the storage subsystem 1011 and peripheral subsystems 1015, 1017 and 1019.

The processor subsystem 1013 further includes a main memory synchronizer 1025 and a buffer store 1027. The main memory synchronizer 1025 resolves conflicts for the use of main memory among the CPU 1021, the buffer store 1027 and the IOC 1023. Conflicts are resolved on a priority basis: the IOC has the highest priority followed by memory writers (from the CPU 1021) and then memory reads into the buffer store 1027.

The buffer store 1027 is a small, high-speed buffer memory that reproduces selected regions of main memory and interfaces with the CPU 1021 to decrease average memory access time. During each memory read, both the buffer store 1027 and main memory 1011 are accessed. If the information to be fetched is already in the buffer store 1027, the attempt to read main memory 1011 is terminated and the needed information is fetched instead from the buffer store. Otherwise the main memory 1011 is read. Every time memory 1011 is read, the CPU 1021 fetches an entire "page" (32 bytes) containing the desired information. This page remains in the buffer store 1027 for a time to meet future references to further information within the page. Since operation of the buffer store 1027 is invisible to the system user, the program controlling the computer at any given moment cannot determine whether the information it is processing has been fetched from the buffer store 1027 or from main memory 1011.

The detailed operations taking place within the CPU 1021 are controlled to a significant extent (but, as will be seen, not completely) by microprograms stored within a control unit 1029. A control unit of this type is described in U.S. Pat. No. 3,634,883 issued on Jan. 11, 1972 to Leonard L. Kreidermacher, and a detailed, general discussion of microprogramming control techniques is presented in *Microprogramming: Principles and Practices* by Samir S. Husson, Prentice Hall, Inc., (1970). Further detailed description of the control unit is given infra.

Some of the firmware for controlling the operation of the processor subsystem 1013 is written into a zone of physical addresses in the main memory 1011 (shown by the shaded area in FIG. 10), beginning at physical address "zero" and extending to a "boundary address". This additional set of microcode, stored in this "hardware area" of main memory 1011 at the time of system initialization, is unique to the particular system installation and contains information related to the type and status of the particular hardware devices employed, the configuration of the system, and special firmware options selected for that installation. Further control of the processor subsystem may be effected manually through hardware-visible switches and pushbuttons located on the system operator's panel (SOP) 1030.

The IOC 1023 of the processor subsystem provides a data path between any peripheral subsystem and the storage subsystem. This path communicates "channel commands" to the peripheral subsystems and controls the resulting data transfers. IOC 1023 interfaces with the peripheral subsystems via the "physical" IO channel 1031. Directly associated with the IOC 1023 is a read-write control unit 1032 capable of receiving, at the time of system initialization, installation-dependent control firmware (as illustrated by the shaded area in block 1032). In addition, the IOC control unit 1032 stores installation-dependent microcode (which may be in read-only storage as illustrated by the unshaded area of the IOC control unit block 1032). Alternatively, or additionally, control microcode for the IOC 1023 may be stored in the hardware area of main memory 1011.

Peripheral Subsystems

Each of the peripheral subsystems 1015, 1017 and 1019 includes a peripheral control unit, a stand-alone microprogrammed processor that relieves the load on the processor subsystem 1013 by controlling IO devices during IO operations. The peripheral control units do this by executing instructions contained in channel programs stored in main memory 1011. These channel programs control the arithmetic, logical, transfer, shift and branch operations performed in the peripheral subsystems.

For example, in peripheral subsystem 1015, the control unit employed is a unit record controller (URC) 1041 which can control several low-to-medium speed unit record devices, such as card equipment, paper-tape equipment, telecommunications devices and system consoles. In the example shown in FIG. 10, URC 1041 controls a card reader 1043, a line printer 1045, and a pair of telecommunication devices 1047. In the peripheral subsystem 1017, the peripheral control unit takes the form of a magnetic tape controller 1051 which operates a pair of tape transports 1053 and 1055. The peripheral control unit in subsystem 1019 is a mass storage controller 1061 shown connected to operate a pair of disc drive units 1063 and 1065.

Device adapters (DA) mediate between each peripheral control unit and the devices it controls and contain the dedicated logic necessary to implement communication with a particular type of device. Depending on the type, a DA controls one or several devices.

The major functions performed by each peripheral control unit are:
(1) the transformation of instructions from the processor subsystem into a series of commands acceptable to the appropriate peripheral device;
(2) packing and unpacking data in the form needed by the processor subsystem or the appropriate peripheral device;
(3) keeping the processor subsystem informed of the status of the peripheral subsystem and of the devices under its control;
(4) independently initiating and processing error and recovery procedures; and
(5) allowing on-line diagnosis of a given peripheral device without disturbing the operation of other devices.

The peripheral control units resolve conflicts for main memory between devices attached to them, while the IOC resolves conflicts between different peripheral control units.

As illustrated in FIG. 10, the peripheral control units 1041, 1051 and 1061 are connected to receive microinstructions from control stores 1042, 1052 and 1062, respectively, each of which may include both read-write and read-only storage sections. The read-write control storage associated with at least selected peripheral control units allows installation-dependent microcode to be loaded at the time of system initialization to render each peripheral subsystem compatible with the remainder of the subsystem.

Input and Output

The architecture of the system depicted in FIG. 10 is based on the simultaneous operation of the processor subsystem and one or more of the peripheral subsystems 1015, 1017 and 1019. Each of the peripheral control units 1041, 1051 and 1061 is capable of executing a limited instruction repertoire distinct from that of the CPU 1021. A set of instructions which performs a peripheral operation is called a channel program. Channel programs reside in main memory and are accessible by both the processor and peripheral subsystems. Specific processor instructions are used to create a channel program, while the execution of the channel program is directed by the IOC 1023 and a peripheral control unit. Once execution of a CPU instruction initiating a channel program is complete, the program is executed by the IOC and a peripheral control unit and the CPU 1021 is free for other operations.

There is one physical channel 1031 for each peripheral control unit connected to the IOC 1023. It is, however, possible to multiplex several operations over one channel. This gives rise to the concept of a logical channel, which is a logically defined communications path between main memory 1011 and a single peripheral device. Logical channels share a physical channel. Physical channels are associated with peripheral subsystems while logical channels are associated with devices (although several logical channels may be associated with a single device).

System Organization and Management

Systems of the type shown in FIG. 10 are normally controlled by an operating system, an extensive set of procedures which provides for efficient handling of hardware, data, and programmed resources in a multiprogramming environment. All program execution, peripheral accesses, memory accesses, and operational actions required to perform a user's computations are controlled by the operating system.

Work to be performed by the operating system may be defined externally by a series of processes via a job control language. Several processes can be active and sharing resources, but only one process per CPU is actually running at any one instant.

The system shown generally in FIG. 10 provides for multiprogramming and multiprocessing operations which are controlled by the operating system which creates and deletes processes within the system and provides for synchronization among processes. The multiplexing of processes in the CPU 1021 is carried out under firmware/hardware control. Processes are normally started and stopped at the initiation and termination of I/O operations, during related job handling, and at other times for purposes deemed necessary by the operating system.

Control Unit

Figure 11:
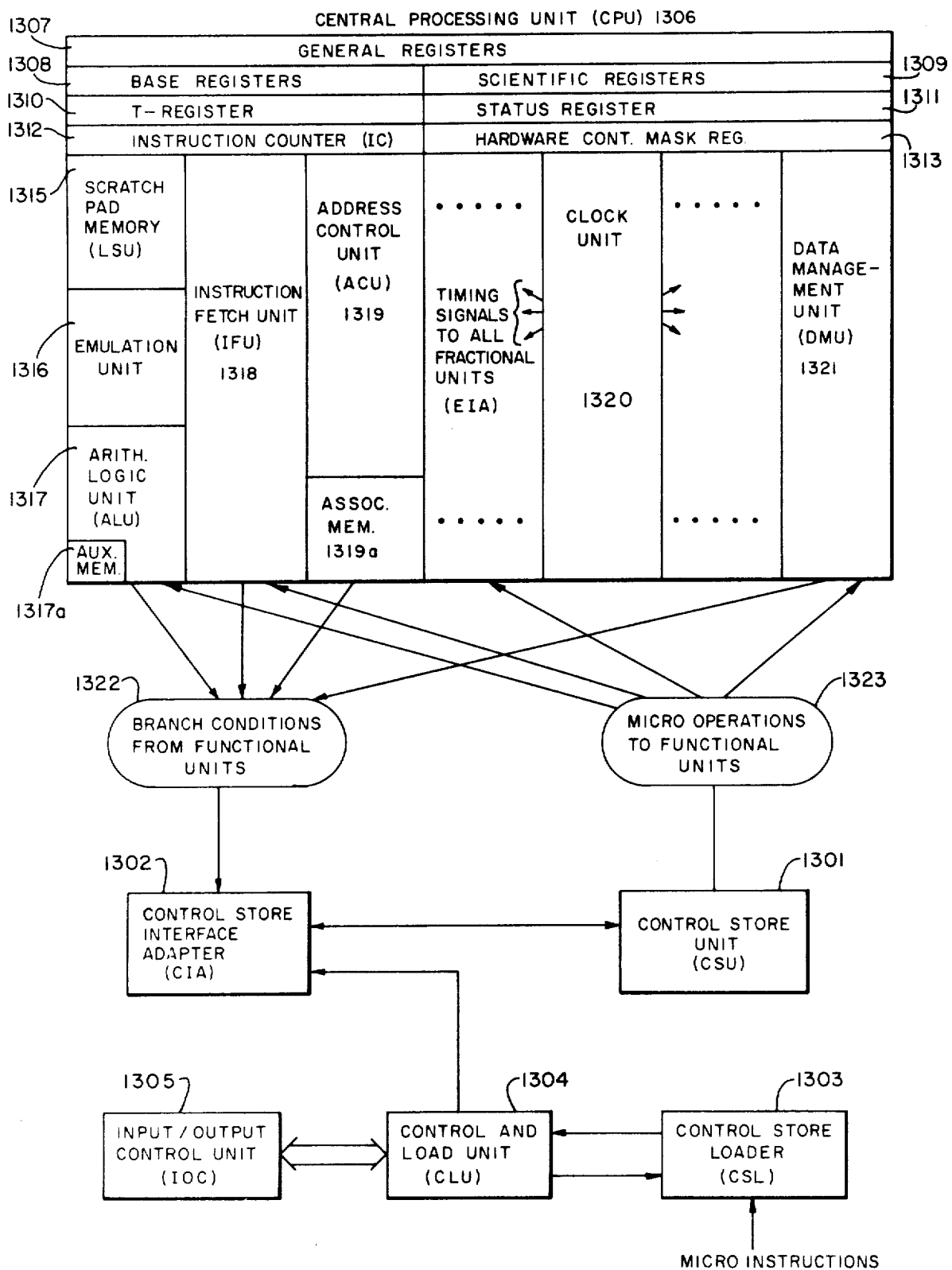
Figure 12:
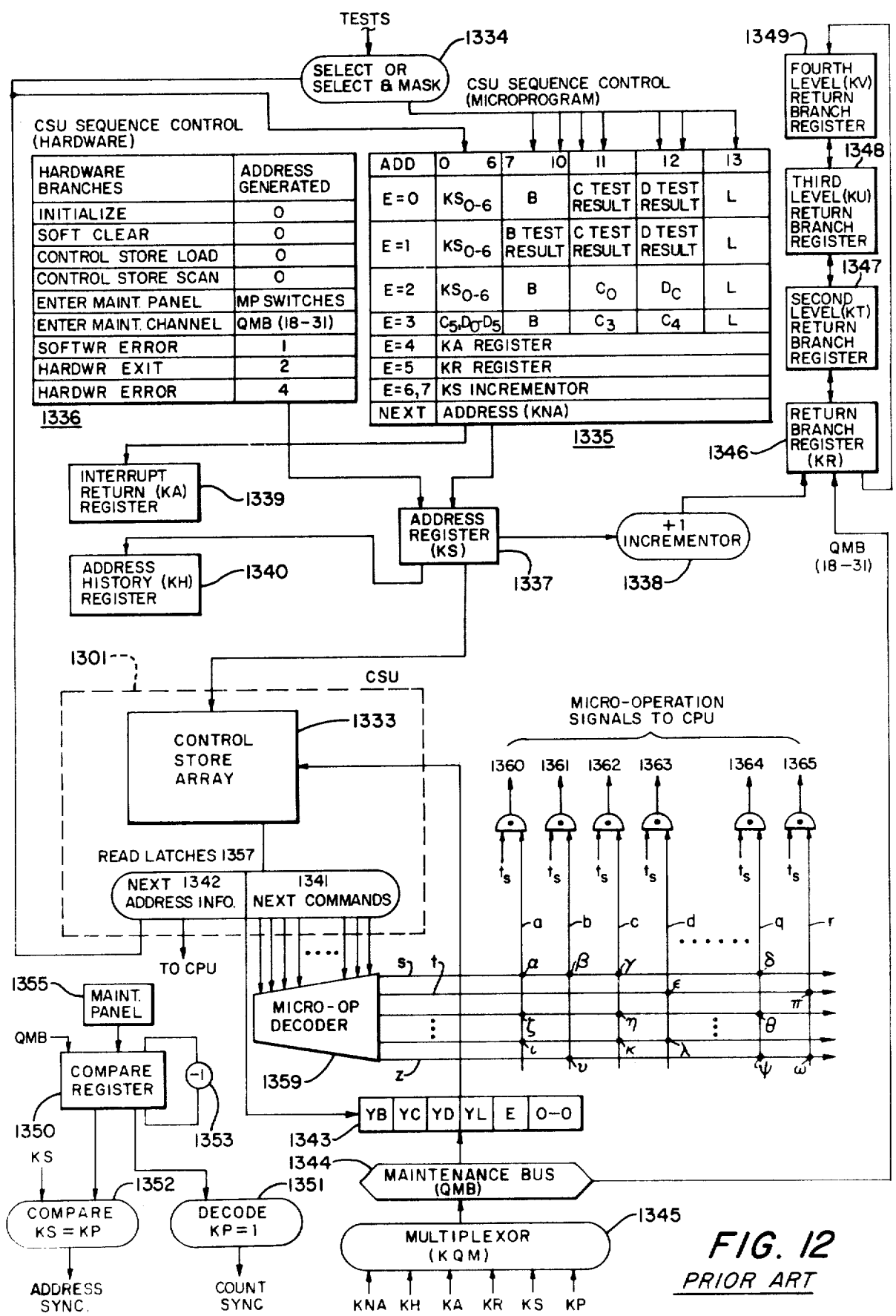

Referring to FIGS. 11 and 12 details of the control unit 1029 of FIG. 10 are shown. (See also U.S. Pat. No. 3,891,974 Issued June 24, 1975.) The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1302 via the control and load unit CLU 1304 and the control store interface adapter CIA 1302. Under normal operating conditions, microprograms are loaded from an external source during system initialization and become a permanent control function of the machine. However, the control store unit CUS 1301 has the ability to be reloaded and initialized in a manner that provides for a variety of central processing unit CPU operational modes. The following modes of operation of the CPU are available under control of the CSU 1301: (a) native mode; (b) emulation mode; (c) concurrent native and emulation modes; (d) diagnostic mode. This capability is possible because the microinstructions resident in the CSU are the source of micro-operations used to control the operation of all other CPU functional units such as the emulation unit 1316, the arithmetic logic unit 1317, the instruction fetch unit IFU 1318, the address control unit ACU 1319 and the data management unit DMU 1321. Also shown within the central processing unit CPU 1021 are general registers 1307, base registers 1308, scientific registers 1309, T-registers 1310, status registers 1311, instruction counter IC 1312, and hardware control mask register 1313.

Typically, the control store unit CSU 1301 is a 9K bipolar integrated circuit programmable read-only memory (PROM) mixed with read/write random access stored (RAM). It has a typical 150 nanosecond read cycle and a 450 nanosecond write cycle. Each location of control store stores one 84-bit microinstruction word (to be later more fully described), and each microinstruction word controls one CPU cycle. As each location of the control store unit CSU 1301 is read, its contents are decoded by micro-operation decoders which provide micro-operation control signals each of which causes a specific operation within the CPU to take place (to be later described in detail).

By grouping locations within each microinstruction word (to be later described in detail) control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessary.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. 12. The CIA 1302 includes logic for control store address modification, testing, error checking, and hardware address generation. Hardware address generation is utilized generally for developing the starting address of error sequences or for the initialization sequence.

The data management unit DMU 1321 provides the interface between the CPU 1021 and the main memory and/or buffer store memory shown on FIG. 10. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control the the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types, the ACU may perform different operations for each address in an instruction. The ACU also contains an associative memory 1319a that typically stores the base address of the 8 most recently used memory segments, along with their segment numbers. Each time a memory request is made, their segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a, it is developed by accessing the main memory tables. However, after the base address of the segment is developed, it is stored in the associative memory, along with the segment number, for future reference.

Interfacing with the ACU, IFU, DMU and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised of 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317a comprised typically of 64 flip-flops for storing miscellaneous states of the computer system.

The CPU also has a clocking unit 1320 which is essentially 2 clocking systems in 1: the first clocking system generates the timing for the control interface adapter CIA 1302 and the second clocking system generates the timing pulses for the operations of the functional unit within the central processing unit.

Figures 13, 14:
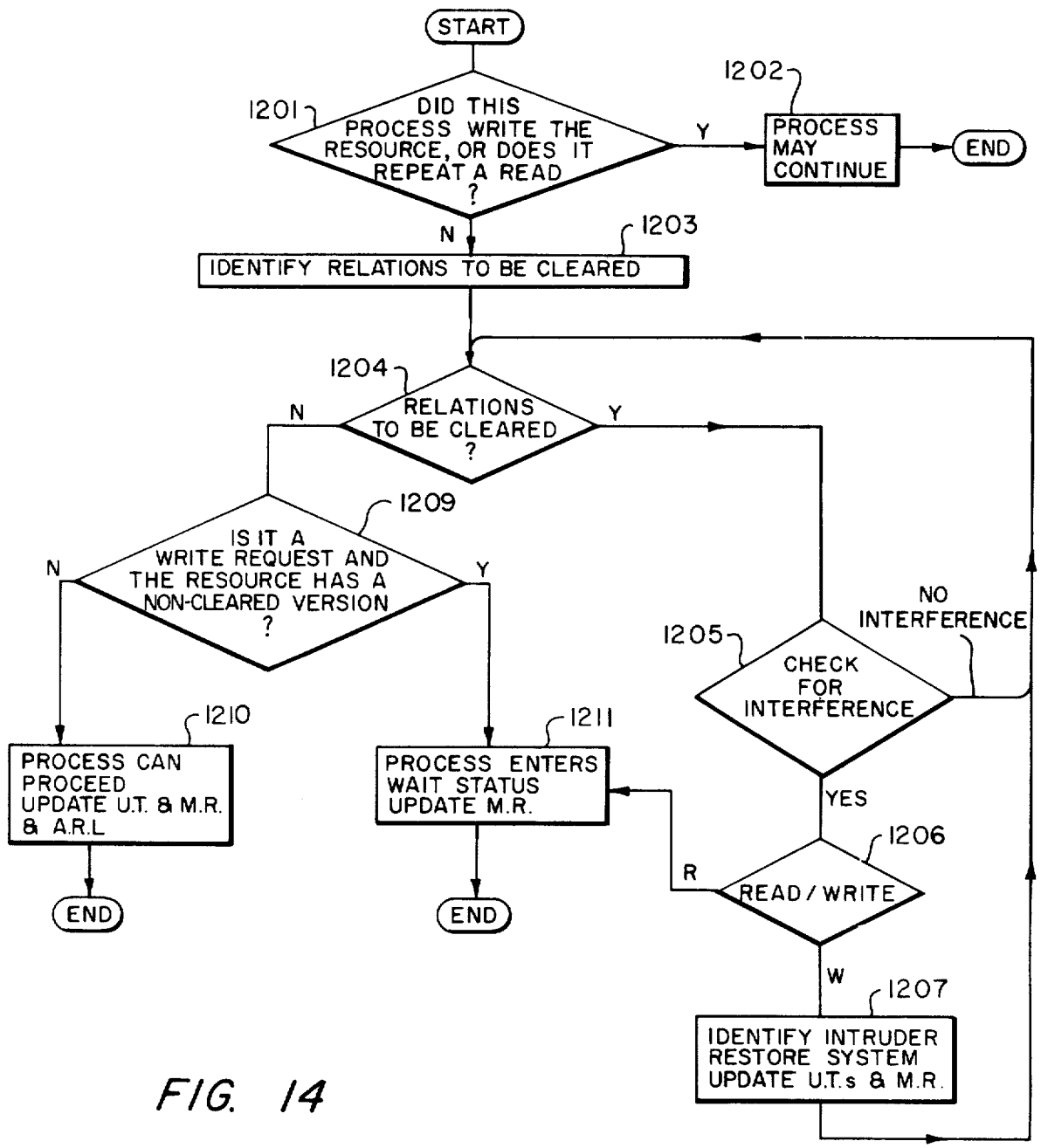
FIGS. 14 and 15 show variations of the "No Dependency" mechanism of the invention.

Referring now to FIG. 13, there is shown the format of the control store word 1325. The control store word is typically 84 bits wide and is divided into 6 main fields.
 (a) sequence type E field 1326 (3 bits);
 (b) branching and/or micro-operations 1327 (23 bits);
 (c) constant generation and designation 1328 (14 bits);
 (d) data to bus 1329 (8 bits);
 (e) micro-operations 1330 (32 bits); and
 (f) checking 1331 (4 bits).

The 3 bit E field of the control store word 1325 is used as a sequence control field. There are typically 7 different sequence types and 1 reserved type. Referring to block 1335 of FIG. 12, when E field equals binary 0, 1 or 2, the branching field A, B, C, D and L of microinstruction 1325 of FIG. 13 is utilized to generate the next address.

The first 6 bits of KS register 1337 are utilized together with the B field, a C test results, the D test results and the L field to provide the next address of the next microinstruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5, a branch is used to initiate a subreturn from a microprogram subroutine.

When used, the contents of the return register KR 1346 are used as the next control store address. The return register 1346 is loaded by issuing a control store command which will load present control store address in KS register 1337 plus 1, from incrementor 1338, into the KR register 1346. A one-level-nesting subroutine ability is provided via the KT return branch register 1347. Every time the KR register 1346 is loaded, the old contents of the KR register are transferred to the KT register 1347; every time the microprogram return is called, the contents of the KT register will transfer back to the KR register. Third level nesting subroutine ability is provided by the KU register 1341 and fourth level nesting subroutine ability is provided by the KV return branch register 1349. When the E field of the control store word is set to binary 6, the next control store word addressed is equal to the present address in KS register 1337 plus 1 in incrementor 1338. When the E field is set to binary 7, the CSU 1301 enters the diagnostic mode and the next address will be the present address plus 1.

In addition to the sequencing control of branching to the next control store address described above and shown in block 1335, there is hardware generated sequence control shown in block 1336 of FIG. 12. (Note: Blocks 1335 and 1336 are in actuality hardware registers drawn so as to depict the different forms that the microinstruction words may take). The hardware generated branches are overriding conditions (such as errors, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register.

Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt block flip-flop for those sequences which are under firmware control. Those sequences under hardware control automatically generate a reset of the block-flop at the end of the sequence. The following conditions, listed by priority, exist in this category: (a) control store load; (b) control store scan; (c) hardware error; (d) software error. The remaining hardware conditions do not set the interrupt block-flop but do cause an immediate action to occur when generated. The following conditions listed by priority, exist in this category:

(a) initialize;
(b) soft-clear;
(c) enter maintenance panel;
(d) enter maintenance channel;
(e) hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenance facility. At the end of the sequence a return is initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state, the CSU can be loaded from the control store loader CSL 1303, the IOC 1305, the main memory 1011 of FIG. 10, or the system operator's panel 1030. When loaded from the CSL, an automatic scan is generated at the end of the load. When loaded from any other media, a scan may be issued by either generating a micro-operation signal or setting the scan switch on the maintenance panel. A control store scan signal causes the CSU to branch to address binary 0. A control store scan is under hardware control for the duration of the sequence. During the scan, the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode, a hardware error detected in any CPU functional unit will activate a hardware error line (not shown). The control store sequence generated will test the system conditions to determine the action to be taken. In the diagnostic mode, error conditions which are hardware detectable are visible to micro-diagnostics. The micro-diagnostics control the action to be taken. A software error signal on the other hand causes the control store to branch to address binary 1. This address is the start of the software error reporting sequence which is under micro-program control.

Referring once again to FIG. 13, the E field 1326 is a 3-bit field for the branch code as previously described. The branching and/or micro-operation field 1327 is comprised of the A, B, C, D and L fields (also shown on block 1335 of FIG. 12) wherein the A field is the upper 6 bits of the next address, the B field is the middle 4 bits of next address of the mask field on 64-way branch, the C field is a 6-bit test field for 1 of 64 tests, the D field is another 6-bit test field for 1 of 64 tests, and the L field is the least significant bit. The K field 1328 is a 14-bit field. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32-bit field which is coded to generate micro-operation subcommands. The P field 1331 is comprised of 4 bits reserved for checking.

In operation the microinstruction words are stored in the control store array 1333. During a cycle of operation, the control store array is addressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source.

In general, decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays. Further, by decoding subcommands with each unit, those signals which are representative of certain conditions existing within the functional unit and are required for the generation of certain subcommand signals do not have to be returned to the CIA unit 1302.

A typical decoder unit 1359 is shown in FIG. 12 as receiving various fields from microinstruction words and generating micro-operation signals a, b, c, d, . . . q, r. A typical micro-operation decoder 1359 receives commands from a microinstruction word. The field from the microinstruction word is decoded and sets one of a plurality of lines s, t, u, . . . y, z high. A matrix is formed by having a second set of lines a to r coupled to the s-z lines at points $\alpha, \beta, \gamma \ldots \omega$. Typically, when the field from a microinstruction is decoded one of the lines s-z goes high. Since the black dots shown in the matrix by Greek letters $\Omega$ through $\omega$ represent impedance coupling between the two sets of lines, any electrical signal propagating along any horizontal wire will be coupled through and propagate along the vertical wire a-r where an impedance coupling (black dot) is indicated. Each vertical line a-r then may be coupled as one input to one each of AND gates 1360–1365. Other input signals may also be coupled to AND gates 1360–1365 including a timing signal $t_s$ from the central timing unit.

Accordingly, as each timing signal $t_s$ goes high, those gates which have all the other input signals high will be enabled and will provide microinstruction signals to predetermined functional units in the CPU. For example, if a command 1341 from read latch 1357 is decoded and a horizontal line is high, the a, b, c and q vertical control lines will be high and AND gates 1360, 1361, 1362, and 1364 will be enabled at the $t_s$ timing signal is applied to these gates. Hence, the combination in which the vertical control lines are coupled to the horizontal control line at different points represented by the Greek letters $\alpha$ through $\omega$, represent a permanent switching matrix for supplying micro-operation signals to the central processing unit CPU for controlling the functional units within the central processing unit by microinstructions furnished from the control store array 1333. Thus, permanent firmware having an alterability feature can be built into the machine by merely specifying the sequence of micro-operations that is required as a capability of the computer system.

Under normal conditions, data is written into the control store array 1333 via the CPU write-data register also known as the local register 1343. A control flop (not shown) defines whether the upper half or lower half of the storage array is to be written. Data from the control and load unit CLU 1304 arrives at the CIA/CSU via the maintenance bus QMB 1344 and is buffered by the storage local register 1343 before being written into the control store array 1333. The storage local register 1343 is time shared as both a read and a write local register. The multiplexer KQM 1345 may be controlled by either the system operator's panel 1030 of FIG. 10 or by the micro-diagnostics and provides a read out path from the registers connected to it. A compare register KP 1350 is provided for non-functional use and is used mainly for maintenance purposes and is utilized along with compare logic 1352, decode logic 1351 and decrementor 1353.

A typical computer system, as the one described above in connection with FIGS. 10, 11, 12, 13, is in general the environment in which the apparatus of the present invention operates. In these circumstances, the apparatus may utilize for its implementation, part of the previous organization and facilities. In particular, it may use the mechanism of the micro-operations. This mechanism can be summarized again as follows. The Control Store Array 1333 on the basis of KS supplied by the Address Register 1337 feeds the read latches 1357. This in turn, via the micro-operation decoder 1359, the matrix and the gates 1360 . . . 1365, indicates to CPU the micro-operation to be executed and at the same time, via next address information 1342 and the CSU sequence controls 1335 and 1336, provides the address of the next microinstruction.

Therefore, a person of ordinary skill in the art will be able to make and use the firmware/hardware implementations of the protection mechanism disclosed by this invention, without undue experimentation, since he is provided with the block diagrams of the apparatuses and the corresponding explanatory texts as hereinafter described. Complex descriptions with matter within the knowledge of those skilled in the art are thus avoided. Even though FIGS. 10, 11, 12 and 13 describe in particular a specific Honeywell machine now commercially available, it is understood that other environments or products of the same or different companies such as IBM 370 may be utilized to practice the invention as well.

Moreover, the protection mechanisms, and the family of instructions disclosed in the present invention may find their application in "non-computer" environments or in environments which do not provide the common facilities discussed supra. Therefore, a specific description of hardware embodiments to be used in these cases is provided to cover those instances (see in particular discussions and explanations added to FIGS. 17a, 17b, 20a and 20b).

The Protection Mechanism

The invention applies to the basic integrity mechanism of a system which performs the functions necessary to prevent failures and errors so that data are neither lost nor damaged. In particular, the protection mechanisms, described in the preferred embodiment of the invention, deal with the prevention of, or recovery from, errors caused by interferences among processes utilizing data and other information in a shared mode.

It can be described also as the monitoring apparatus that allows, or rejects, the accessing of the CPU 1021 (acting on behalf of some process) upon data elements, messages or equivalent pieces of information contained in the storage (buffer storage 1027 or a main memory 1011) or in peripheral or communication subsystems 1015, 1017, 1019.

The protection mechanism is called into action whenever a process has to access a resource (data or other pieces of information). In the preferred embodiments here described, the mechanism checks whether such an access causes interference. If so, an appropriate restoring procedure is activated. Once the access has been legitimated, the mechanism checks whether there are some other causes to delay or refuse the access and proceeds accordingly.

As described earlier, the causes for the additional restrictions vary according to the specific mechanism and may have their rationale in a desire for a non-dependency among processes, a limitation in the space available for the storage of successive versions of the resources, etc.

In particular, the preferred embodiment of "No Dependency" guarantees that a process failure does not cause the failure of another as a consequence of data dependency. This method also limits to one the number of non-cleared versions of a resource, which is also a very convenient feature.

To complete the operation, beside the actions outlined above, the mechanism also performs the operation of resuming the "waited" processes, if any, as soon as the causes for their temporary suspensions are terminated. The invention operates at any level of granularity of the resource. Granularity is defined as the size of a resource, i.e., a field, a record, a page, a column, etc.

The mechanism of protection will be described first for the No Dependency embodiment and then generalized.

THE NO DEPENDENCY MECHANISM

Figures 9A, 9B, 9C:
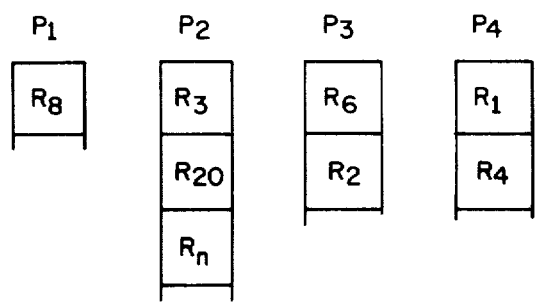
FIGS. 9a, 9b, and 9c illustrate the Utilization Tables, the Matrix of Relations, and the Affected Resource Lists, basic tools of the invention.

To describe the mechanism in the present invention two convenient elements of support are introduced: the Utilization Table (U.T.) FIG. 9a and the Matrix of Relations (M.R.) FIG. 9b.

The Utilization Tables are one per utilized resource or group of resources, whichever element is chosen as quantum of granularity for interference protection). They list the non-cleared readers and writers of the resource.

These Tables or equivalent means are common tools for many control mechanisms.

The Matrix of Relations (one per system is sufficient) is a square matrix and has one row and one column per each non-cleared process.

Each element of the matrix indicates the relations existing between the process on the row and the process on the column ("process on the row" VERB "process on the column"). For instance:

symbol 1 indicates "process on the row follows but does not depend upon process on the column";
symbol 2 indicates "process on the row follows and depends upon process on the column";
symbol 3 indicates "process on the row waits for process on the column to be terminated and cleared"; etc.
symbol 0 indicates that process on the row has none of the previous relations with process on the column.

Obviously, the symbols are purely arbitrary and their meanings can vary from method to method. The above convention is the one in the present description.

The Matrix of Relations is typical of the interference methods based upon the present invention, but it must be emphasized that:

it is not essential, since the relations can also be traced back from the U.T.s every time they are needed. Nevertheless the maxtrix is a rather powerful and simple tool, convenient to achieve high level of efficiency.

it can be implemented also in a "non-matrix" form, as long as its substitute carries the same information. For instance, a graph as in FIG. 6b can carry the same information.

A third element of support for the mechanism is the list of resources affected by each process. These lists (Affected Resources Lists, A.R.L.), FIG. 9c, are not peculiar of a mechanism of protection, but rather of any mechanism that wants to perform a selective recovery. In other words, if it becomes necessary to abort a process, the A.R.L. provides the list of the resources that have been affected by that process and therefore need restoration. More in general A.R.L. may indicate other recovery actions, like the annulment of a message, etc.

If instead the recovery is not selective, like for instance the case where it is based upon a generalized roll back of the system to a previous check point, these A.R.L. lists are not necessary.

We assume them here in order to describe the more sophisticated selective approach to our preferred embodiments.

To understand the dynamics of the content of these tables (U.T., M.R., A.R.L.) the following additional explanations are offered:

When a process (more precisely a process-phase, since, as noted in Section 10.1 of the General Discussion, all over the specification the word process is used in this broad sense) is "born", i.e. accepted as an actor in the system, it is given an identifier, or name, which we assume coincident with the number of the row (and column) assigned to it in the Matrix of Relations. This combination of row and column in M.R. is initialized with zeroes.

The process is cancelled out of the matrix when it is terminated and cleared.

Every time the mechanism of protection discovers a relation among the processes, it notes it on the M.R. With the No Dependency mechanism, the symbols, beside the zero, are 1 for a "follows but does not depend upon" and 3 for a "wait for". The symbol 3 overrides a preexisting 1 and 1 overrides the 0.

The Utilization Table of a resource is initially empty. When a process accesses the resource to read or create a new version of it, the name of the process is listed and the type of operation (read/write). A process that reads its own version is not indicated as reader (the previous indication as a write prevails). A process is listed only the first time it does a certain operation. If it reads again or if it modifies again the same version of a resource, it is not listed again. When a process is cleared and is erased from the matrix, it is also erased from the U.T.s. The size of the U.T.s. therefore does not increase continuously, but reaches a sort of dynamic equilibrium.

The A.R.L. of a process, initially empty, grows with the activity of the process and is erased when the process is cleared. Note that we here assume that these lists are used. But they are not essential. Their lack can be circumvented and will not affect the validity of the mechanism described hereafter nor their generality.

Referring now to FIG. 7 a preferred firmware embodiment of the No Dependency mechanism is described below.

START. The mechanism intervenes whenever there is a request to read or write on a resource.

Diamond 701. If the requesting process has already written the resource (i.e. it has already created a new version of the resource) or repeats a previous reading, the request is approved (exit to box 702 that authorize the process to continue), otherwise the operation continues with box 703. To perform this check, the mechanism reads from U.T. whether the process is already listed as the writer or repeats a read.

Box 703. From U.T. of the requested resource the mechanism identifies which relations have to be cleared, if any.

To read:
(a) if there is not a non-cleared version of the resource, there is no relation to clear.
(b) if there is a non-cleared version, its writer must follow (without dependency) the requester. If such a time relation is not already on M.R., as indicated by the absence of symbol 1 or 3 on M.R., the relation is transmitted to the following step (diamond 704) for consideration.

To write:
(a) if there is not a non-cleared version of the resource, the applicant writer must follow (without dependency) the readers of the resource, if any. The relations that do not already exist on M.R., are transmitted to the following step (diamond 704) for consideration.
(b) if there is a non-cleared version of the resource, the applicant writer must follow (and wait for) the writer of that version. If such a time relation does not already exist on M.R., as indicated by the absence of symbol 1 or 3 on M.R., the relation is transmitted to the following step (diamond 74) for consideration. In this case, for reasons related to the restoring strategy, the identities of the readers of the cleared version are also transmitted, to be considered in case the relation with the writer fails the test.

Diamond 704. If there are relations to clear, the mechanism proceeds to diamond 705, otherwise to step 709.

Diamond 705. This is the key step of the mechanism, the one where the new relations implied by the utilization of the resource are subjected to the basic test for interference. The test relies primarily on the use of one instruction (or set of instructions, if so implemented), DETECT, that is discussed later on in detail (THE FUNDAMENTAL CHECK FOR INTERFERENCE). The test determines which relations can not be added to the M.R. because they contradict the already established set of precedences. If all relations are accepted, the mechanism goes to diamond 709, otherwise it takes note of the rejected relations and goes to 706.

In the particular case of a request to write on a resource with a non-cleared version, the acceptance is based on the relation between the requester and the previous writer. Note that if the relation is not acceptable, the mechanism goes, as it must, to diamond 706 but it tests in addition the relations with the readers.

Diamond 706. An interference caused by a request to read is avoided by rerouting the request to the non-cleared version which, implies a Wait for the process (box 711). If the interference is caused by a request to write, a restoring action is necessary and the next step is box 707.

Box 707. Any strategy is accepted which eliminates the interferences previously noted and restores the system. In the preferred embodiment the simplest rule for this strategy is the following:

If only one interference has been detected, the process ($p_j$) which appears as the second term in the rejected relation ($p_i$ follows ... $p_j$) is selected for abortion (i.e. it is considered the intruder).

If more than one interference have been detected, the requester itself is selected for abortion (i.e. it is considered the intruder).

Alternatively, if the application justifies it, the optimum candidacy for abortion is selected with one of the more sophisticated methods of Section 8 of the General Discussion. In particular:

The list of all processes which appear as second terms in the rejected relations is made.

The abortion of each process in the list is selectively simulated on M.R. and a test is made to ascertain whether its elimination cures other interferences, beside the one for which it is in the list. This allows other processes to be eliminated from the list.

If the list is reduced to one process, this one is selected for abortion, otherwise the requester is the selected one.

In any case, the system is eventually restored utilizing the A.R.L.s. Then the U.T.s and M.R. are updated accordingly.

Diamond 708. If the requesting process has not been aborted, the next step is the diamond 709.

Diamond 709. The interferences, if any, have been taken care of. The mechanism permits the process to proceed (Box 710) if a dependency is not created, i.e. if the request does not modify a resource which has already a non-cleared version. Otherwise, the process enters the wait status (Box 711).

Box 710. U.T., M.R. & A.R.L. are updated, then the process proceeds,

Box 711. M.R. is updated (symbol 3) and the process enters the wait status.

A variation of the above-described embodiment for the No Dependency (FIG. 7) is shown by FIG. 14. If it is assumed that the requesting process cannot be selected for abortion, the basic difference between the two embodiments is that instead of performing the restoring actions all together as in FIG. 7 (Box 707) the embodiment of FIG. 14 identifies and eliminates the intruders one by one. While FIG. 7 leaves room for a restoring action based on a variety of "global strategies" (and the description of Diamond 707 above gives an example of such a strategy), FIG. 14 implies fewer alternatives but the implementation may be simpler.

Boxes 1201 to 1211 can be described as the corresponding boxes 701 ... 711, with an exception for 1205 and 1207.

Diamond 1205. One relation is checked for interference. If there is not interference, the mechanism branches to diamond 1204, chooses another relation to clear and so on until exhaustion. If the relation interferes, the mechanism branches to 1206.

Box 1207. For the identified interference the "intruder" is considered to be the process that appears as the second term in the rejected relation "$p_1$ follows ... $p_2$". (Simple rule described in Section 8 of the General Discussion. A more sophisticated rule of Section 8 may be adopted instead). To restore the system to the status that would have existed if the intruder had never operated, the mechanism utilizes the A.R.L. of the intruder to identify the resources to restore and any other action to provide for.

U.T.S. and M.R. are updated to reflect this restoration i.e. restoring the system to the status that would have existed if the intruder had never operated. Then the mechanism returns to diamond 1204.

NOTE: A procedure like the one of FIG. 14 is suitable for an environment which does not contemplate the possibility of aborting the requesting process.

Figure 15:
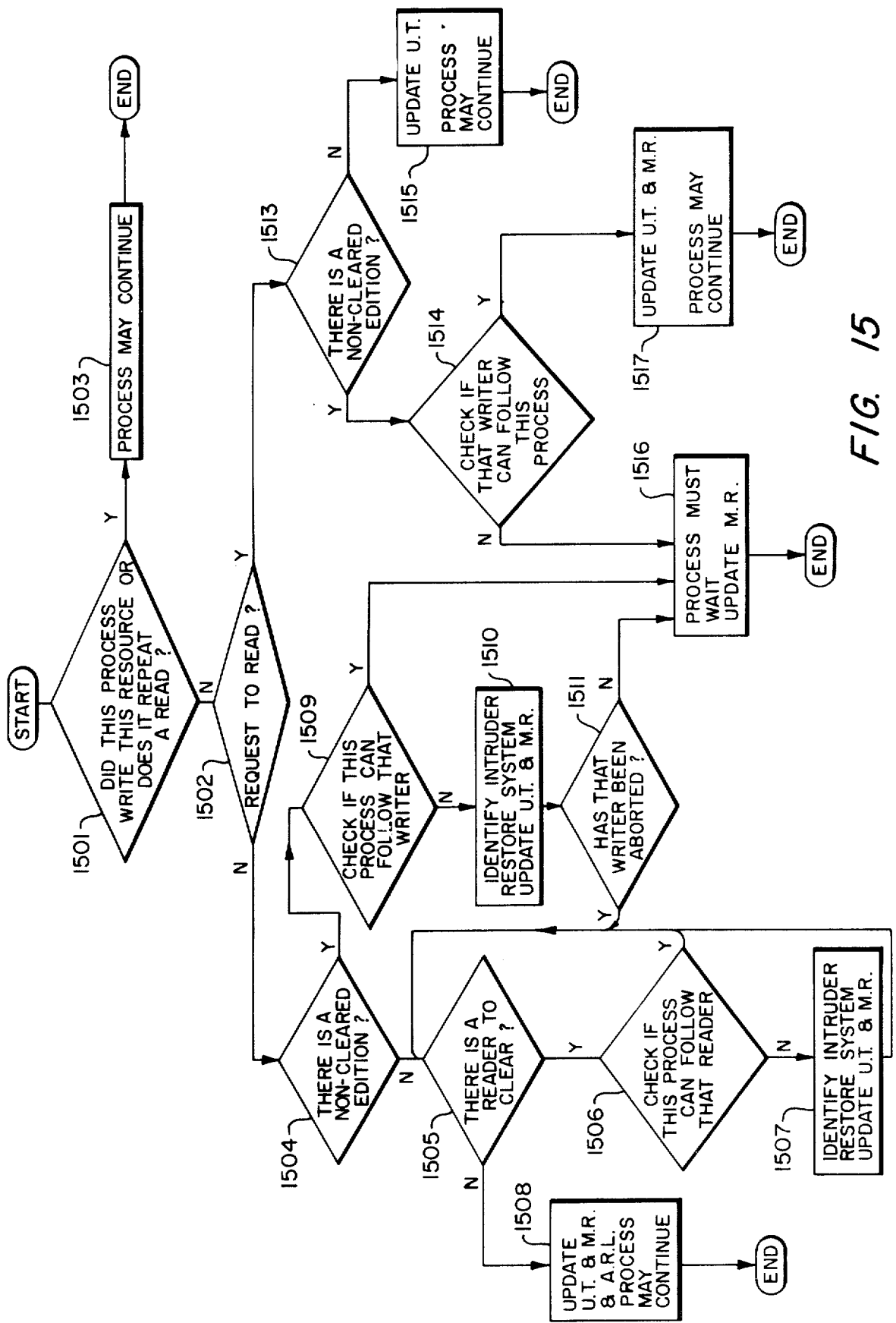

To conclude this section it is worthwhile to note that the variations according to the mechanism of "No Dependency" which may be implemented are not only of the type shown by FIGS. 7 and 14, where some functions are slightly different, but may be purely formal or instrumental. FIGS. 14 and 15 are an example of such a variation, i.e., the sequence of steps is rearranged but the functions are identical. The advantage of this variation is that it can provide a quicker execution even though the complete layout has more branches and appears more complex.

THE FUNDAMENTAL CHECK FOR INTERFERENCE

Referring once again to FIG. 7, Diamond 705 of FIG. 7 is based on an operation that we call DETECT. DETECT implements the fundamental check for interference, according to the concept discovered by the inventor.

The DETECT operation is a check of the Matrix of Relations (M.R.) to determine if the inverse of the relationship under test appears in the M.R. It should be noted that this relationship may appear explicitly or implicitly. The latter may occur due to the transitive property of the time relationships.

Figure 16A:
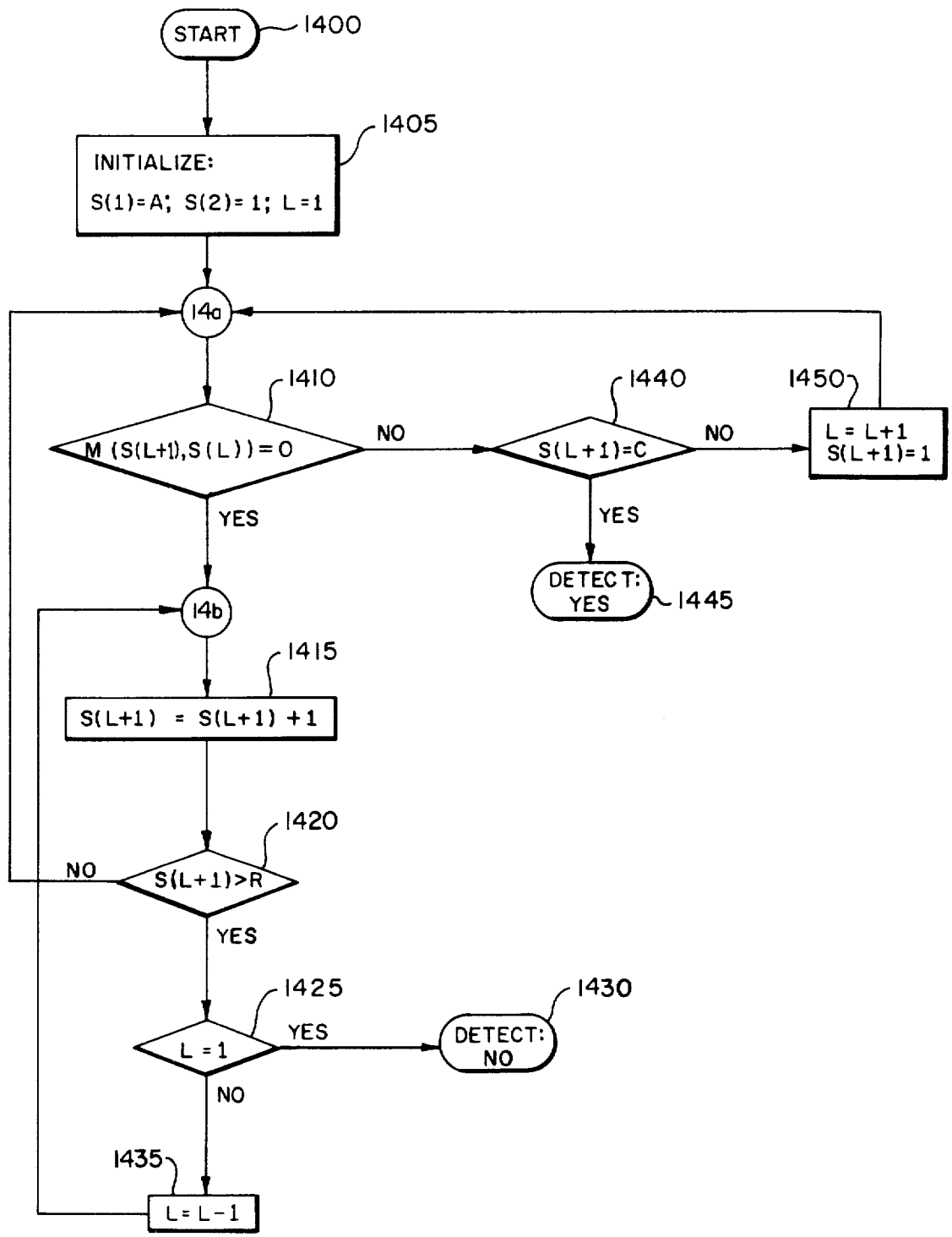
FIGS. 16a and 16b show two implementations of the basic DETECT function of the invention.
Figure 16B:
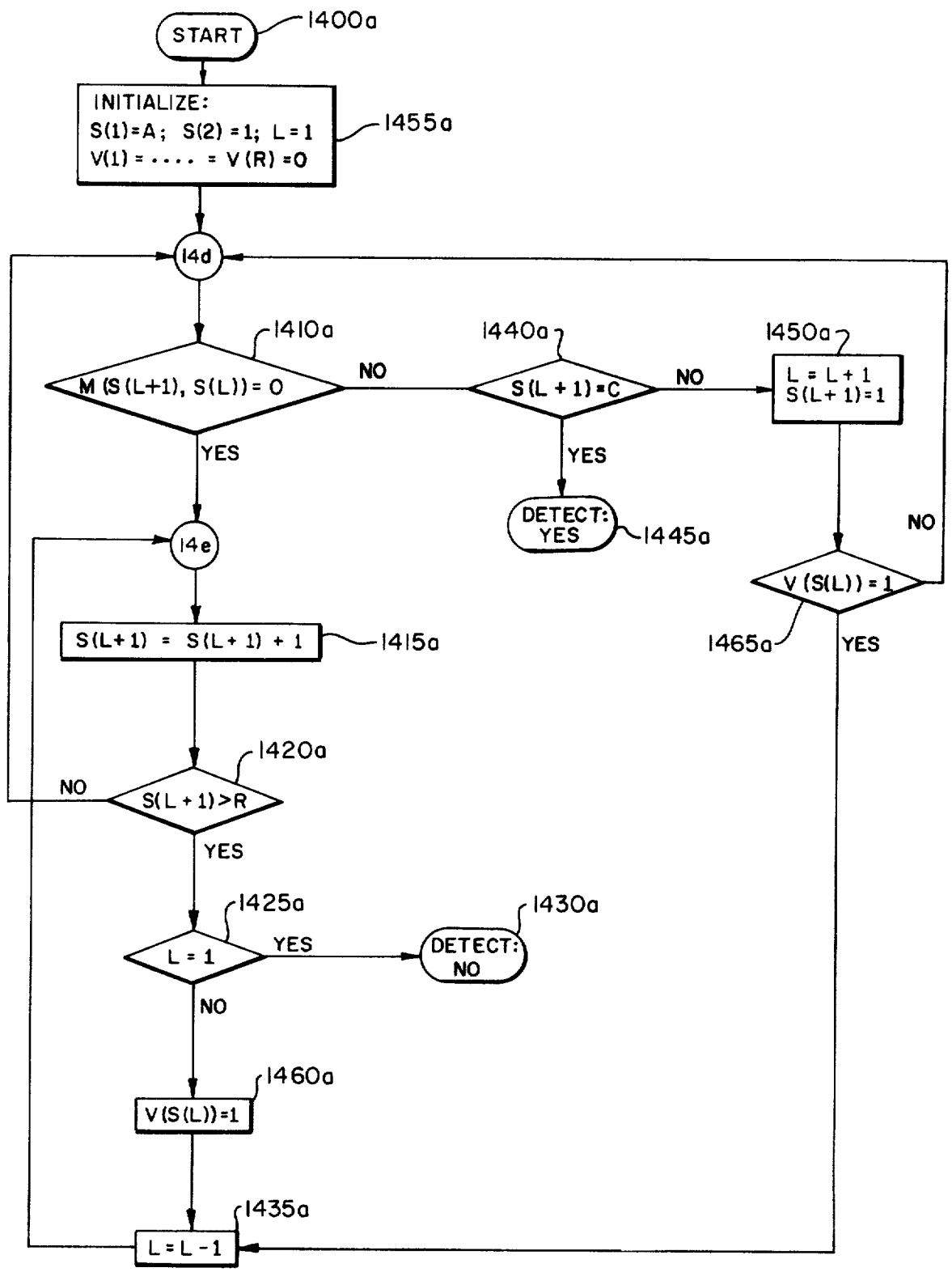

The preferred embodiment of the DETECT operation is one of the firmware and hardware embodiments shown in FIGS. 16a and 16b and in FIGS. 17a and 17b. However, it should be noted that software embodiments (as well as other firmware/hardware embodiments) are possible. Software embodiments in the form of PL1 program listings correspondent to FIGS. 16a and 16b are disclosed in a next section:

SOFTWARE EMBODIMENT OF DETECT

FIGS. 16a and 16b are now discussed as Flowcharts for the firmware or hardware embodiments of DETECT which will be presented in a next Section: Firmware and Hardware Embodiments of Dectect.

DESCRIPTION OF FLOWCHARTS FOR FIRMWARE AND HARDWARE EMBODIMENTS OF DETECT

The logical background for the Flowcharts has been presented by Section 10.1 of the General Discussion. (The No Dependency Mechanism—Detailed Description): (In particular at point 3 of page 27, of that Section).

In FIGS. 16a and 16b certain variables corresponding to working registers are utilized for tracking purposes during the checking operation. M(x, y) is an R×R matrix of relationships, capable of memorizing relationships for R processes. In the following description, the first or x variable of the matrix is called the row and the second or y variable is called the column. Let us assume that the names (Identifiers) of the processes are numbers and that these numbers correspond to the position (row and column) assigned to the process in this matrix. Let us assume also that the coefficients of the matrix have the conventional meanings discussed in the above mentioned Section of the General Discussion; in particular 0 means "no direct relation between the process in the row and the process in the column". For this embodiment it is sufficient to discriminate between zero and non-zero coefficients, because we here assume, as in the General Discussion, that all non-zero values indicate a "follow" relationship.

S(i) is a vector of R elements (i=1, 2 ... R) indicating a sequence of processes tested. L is a positive integer used as an index or counter for S(i). In block 1405, S(1) and S(2) and L are set to their initial values, A, 1 and 1 respectively. During this description it is assumed that the DETECT operation is being used in a context like diamond 705 of FIG. 7 to check the possibility of introducing in the matrix a new relation "A follows ... C". The operation of diamond 705 may require to check one or more of these relations: the DETECT here described would be applied to each relation to be tested. It may be anticipated that the one-relation case is the most likely to occur. A multifunctional DETECT is presented later in THE GENERALIZED DETECT to extend the instrument.

Continuing with the description of FIG. 16a, the operation proceeds to circle 14a and to diamond 1410. In diamond 1410, one coefficient of the matrix is tested to see if it equals zero. The first coefficient examined is in the first row and in the column corresponding to the process under test, i.e. process A. If the coefficient does not equal zero, a relationship has been detected between process in the row and process in the column, indicated by S(L+1) and S(L) respectively, and the operation branches to diamond 1440. In diamond 1440, the row entry is tested to determine if it is equal to C, that is, to determine if the relations already in the matrix identify a sequence of precedence opposite to the one to check. If so, the operation branches to circle 1445 which is an exit from the DETECT operation corresponding to rejecting the relation under test. This eventually leads to diamond 706 in FIG. 7. If the test in diamond 1440 yields a NO, operation branches to block 1450 in which the L counter is incremented by one and a corresponding new vector element S(L+1), where L is the new L, is initialized to one. Operation then branches to circle 14a. In this manner, the process which has been detected to follow A and which is now memorized by S(L), is tested in its turn to see if it precedes C. It should be noted that this looping in the searching mechanism is a consequence of the transitive property of the relations of precedence. If the test in diamond 1410 yields a YES answer, then the operation branches to point 14b and to block 1415.

Since the entry in the matrix does not indicate a precedence relationship, the next entry, that is the next row in the same column should be tested to see if it yields a precedence relationship. Therefore, in block 1415, the value of the vector element for the row entry is incremented by one. In diamond 1420, the row entry is tested to see if it is greater than R. If so, a complete column has been tested without detecting an interference loop and the operation branches to diamond 1425. In diamond 1425, a determination is made of whether L=1. If it does, the column for which testing has been completed is A, the first process in the relation A follows C which must be cleared. The operation branches to circle 1430 which is to say that no interference has been detected. If all relations to be tested (for the check of diamond 705 of FIG. 7) are so approved this corresponds to branching from diamond 705 of FIG. 7 along the "None" path to diamond 709. If the test in diamond 1425 is NO, then the operation branches to block 1435 in which L is decremented by one. Operation then branches to point 14b. In this manner, the checking of the previous column reinitiates at the row entry one further than previously tested and just cleared. If the test in diamond 1420 yields NO, that is, if the column has not been completely tested, the operation branches to point 14a and the next entry is tested (i.e. same column, next row).

The steps described in FIG. 16a perform the DETECT operation. However, there is no provision for recording that a column has already been checked during a previous branching of this same DETECT operation. Consequently, a column may be checked more than once. This is unnecessary and results in additional time requirements for implementation of the invention. In FIG. 16b, a modification to this implementation is disclosed in which a vector V, V(1) to V(R), is used to perform just such a recording function. It should be noted, however, that although performing the tracking operation increases the speed of operation, it does so at the cost of additional hardware elements, namely, those required to store and access the vector elements. Therefore, depending on particular system requirements and trade-offs, either the firmware/hardware for FIG. 16a or 16b may be preferable.

In FIG. 16b, operation starts at circle 1400a. In block 1455a, the variables S(1), S(2), L, as well as the vector V are all set to initial values. For the vector V, all of the elements of the vector V are set to zero. Operation then proceeds to point 14d and to diamond 1410a which is identical to diamond 1410 of FIG. 16a. If the test in diamond 1410a yields NO, the operation branches to diamond 1440a to determine if the process which is being preceded is C, the forbidden process. If so, the operation branches to circle 1445a which is a YES answer to the DETECT question (i.e. the relation interferes). If the test in diamond 1440a yields a NO, the operation branches to block 1450a where L is incremented by one and S(L+1) is initialized to one. At this point, the operation executes diamond 1465a in which the vector V is utilized to avoid repetitious checking. If the vector entry V(S(L)) is equal to one, then the column in M.R. corresponding to S(L) has already been checked. The operation branches to block 1435a where L is decremented. If the test in diamond 1465a shows that the entry is not equal to one, the row has not been checked and the operation branches to point 14d. The operations corresponding to diamonds 1410a, 1420a 1425a, blocks 1415a, 1435a and circle 1430a are identical to those numbered similarly and shown in FIG. 16a and will not be further described with the following exception. If the test in diamond 1425a shows that L is not equal to one, a branch is made to block 1460a. In block 1460a, V(S(L)) is set to one which corresponds to making a notation that the column S(L) has been checked. From block 1460a, the operation then proceeds to block 1435a.

NOTE: A very simple variation of the preceding figures and explanation includes in the DETECT function the inspection to ascertain whether the sought precedence has already been noted in the Matrix of Relations. This inspection has been so far indicated as one of the operations done by diamond 703 of FIG. 7. In another variation, DETECT can be implemented with the exploration of the matrix along the rows instead of the columns, which is accomplished by substituting M(S(L), S(L+1)), to M(S(L+1), S(L)) in diamond 1410 (and 1410a). In this case the roles of A and C must be exchanged in 1405 and 1440, (and 1455a and 1440a) because the exploration reveals which processes precede, instead of which processes follow, the process in S(1). For simplicity the discussion of these and other possible variations is omitted, being understood that the principles of the present invention can be applied or implemented in a variety of dissimilar modes, without departing from the true spirit and scope of the invention.

SOFTWARE EMBODIMENT OF DETECT

Alternative embodiments of the DETECT operation may be in the form of a computer program. The following is such a computer program implementing the invention utilizing a PL1 program listing.

L=1;
S(1)=A;
S(2)=1;
14a: if M(S(L+1), S(L))=0, then go to 14b;
if S(L+1)=C, then go to 1445;
L=L+1;
S(L+1)=1;
go to 14a;
14b: S(L+1)=S(L+1)+1;
if S(L+1) ^>R, then go to 14a; (the symbol ^> is utilized in Honeywell computer machines for "not greater than").
if L=1, then go to 1430;
L=L-1;
go to 14b;

Obviously, 1445 and 1430 are labels for exits corresponding to DETECT YES and DETECT NO.

The following is a PL1 program listing for the DETECT operation corresponding to the firmware embodiment shown in FIG. 16b and discussed supra.

do X=1 to R;
V(X)=0;
end;
L=1;
S(1)=A;
S(2)=1;
go to 14d;
1465: if V(S(L))=1, then go to 1435;
14d: if M(S(L+1), S(L))=0, then go to 14e;
if S(L+1)=C, then go to 1445;
L=L+1;
S(L+1)=1;
go to 1465;
14e: S(L+1)=S(L+1)+1;
if S(L+1) ^>R, then go to 14d;
if L=1, then go to 1430; V(S(L))=1;
1435: L=L-1;
go to 14e;

Obviously, 1445 and 1430 are labels for exits corresponding to DETECT YES and DETECT NO.

FIRMWARE AND HARDWARE EMBODIMENTS OF DETECT

The detailed operations taking place within a CPU are controlled to a significant extent by microprograms stored within a control unit. A control unit of this type has been described herein supra and in U.S. Pat. No. 3,634,883, issued on Jan. 11, 1972 to Leonard L. Kreidermacher, and a detailed general discussion of microprogramming control technique is presented in *Microprogramming: Principles and Practices* by Samir S. Husson, Prentice Hall, Inc. (1970). As a consequence of that, since the present invention has its most frequent field of application in the Data Processing Systems, a complete description for the implementation of the DETECT is already provided by the FIGS. 16a and 16b themselves (and their corresponding FIGS. 19a and 19b, to be given later). A micro-operation technique, utilizing stored data and signals for conditional and unconditional branchings and for data transfers, implements the actions described for each diamond and box illustrated in the figures. These figures, with the corresponding explanatory texts, are at a sufficient level of detail to convey to the person of ordinary skill in control techniques, the information necessary to permit a firmware/hardware implementation of the various DETECT's functions they represent.

However, in order to cope with special cases where the usual facilities may not be available, FIGS. 17a and 17b (and later on FIGS. 20a and 20b) present a specific hardware implementation. To prevent undue burdening of the description with matter within the knowledge of those skilled in the art, a block diagram approach has generally been followed, with a functional description of each block and specific identification of circuitry it represents. The individual engineer is free to select elements and components such as flip-flop circuits, shift registers, etc. from his own background as from available standard references such as "Arithmetic Operations in Digital Computers" by R. K. Richards, (Van Nostrand Publishing Company), "Computer Design Fundamentals" by Chu (McGraw-Hill Book Company Inc.) and "Pulse, Digital and Switching Waveforms" by Millman and Taub (McGraw-Hill Book Company, Inc.). Moreover, most of the details that are well-known in the art will be omitted from this description. For example, the transfer of information from one register to another is well-known and is only generally indicated herein. Illustrations of single lines which may, in fact, represent plural lines for parallel transfers is well understood by those of ordinary skill in the art. Even though some details are eliminated, the basic description of the entire hardware system given in FIGS. 17a and 17b will enable one skilled in the art to understand the complete embodiment of the present invention.

The hardware implementations of the DETECT instruction of the invention are shown on FIGS. 17a, 17b, 20a and 20b. It is incorporated into the processor subsystem 1013 of FIG. 10 utilizing prior art hardware elements as described in greater detail below. The incorporation of new instructions in hardware into any prior art computer system for providing additional capability to the computer system is well-known among persons of ordinary skill in the computer art. The DETECT instruction is described below referencing FIGS. 17a-b and FIGS. 20a-b.

FIG. 17a implements FIG. 16a in hardware and can be described as follows:

Let us first clarify the conventions adopted:

The symbols • and + are for the AND and OR gates respectively.

As a rule the capital letters like LE, indicate a variable of 1 bit, whereas the "quoted symbols", like "$Q_3$", indicate a multibit quantity (a byte or so).

As a rule the single line indicates that the carried information is of 1 bit, whereas the double line indicates information of a byte or so.

Among the various symbols:

D represents the decoded output of the instruction DETECT.

$T_1$ and $T_2$ are the timing master signals for the System. In general, $T_1$ is used here to time the change in the count (step) indicated by the Sequencer Q, $T_2$ is used to time the function that has to be performed at each step.

The values that appear as inputs to the various gates, registers, etc., are either provided as outputs by some other gates, registers, etc. or are provided as "wired" values where necessary, for example wired values are shown as 0, 1, B, R. It should be pointed out at this time that output signals of components shown on FIGS. 17a-b and FIGS. 20a-b are connected to inputs of other components shown on these figures which carry the same name. Hence, for example, the outputs of AND gates 1703 and 1703a $D_1$ and $D_2$ respectively are supplied as one input of AND gates 1702, 1704, 1705, 1706, 1707, 1708, and 1709 and also through AND gates 1710, 1711, 1712, 1713, 1714, 1715, 1716, 1717, 1718, 1719, 1720, 1721, respectively. The output "0" of AND gate 1704a is applied as one input to sequencer 1701a. Where a yes or no answer is provided as an output signal, the designer may utilize this as a control signal to set or reset a flag or may utilize it as a conditioning factor in the CPU to effect a conditional branch. The output "S(L+1) is provided as at least one input signal of AND gates 1714b and 1717a and 1712a. The outputs "S(L)" of registers S are also applied as inputs to AND gates 1712b, 1715a, 1720. The outputs to the arithmetic unit 1701c are applied to AND gates 1716a, 1718a and 1721a. Outputs of the comparator 1701b are applied to some AND gates coupled to OR gates 1701, AND gates 1704, 1705, 1707, 1708. Of course the outputs of memory 102 are generally applied to the requesting unit. The first case applies to symbols representing variables (like "Q", "L") the latter applies to symbols representing constants (like "1", "$Q_9$", "0").

We assume that processes are identified by numbers 1 to R, if R is the maximum number of processes the mechanism handles. The number indicates also the position of the process in the Matrix of Relations. Let us now describe some components:

The sequencer 1701a is a counter of 14 steps or any equivalent apparatus which provides 14 mutually exclusive statuses $Q_0, Q_1, \ldots Q_{13}$. Each step (or status or count) is identified by a corresponding (one bit) output signal $Q_0, \ldots Q_{13}$. (Note that $Q_0 \ldots Q_3 \ldots$ etc. are one bit signals indicating whether the sequencer is in these statuses, whereas "$Q_3$" . . . "$Q_9$" . . . etc. are multibit codes to command the sequencer to be in these statuses).

The Sequencer Q has two inputs: one to increase the count by 1, the other to receive the value ("Q") to which to set the counter. Passage of the sequencer from one step to another depends upon the inputs: if for example gate 1702 is enabled because input signals $D_1$ is high, the sequencer advances one step (e.g. from Q3 to Q4), if on the other hand the "Q" input signal from AND gate 1704a is a new value from any of the AND gates coupled to OR gate 1701 than was previously present there, the sequencer then steps to a new value. Moreover, it should be noted that there is never a conflict among the inputs to the sequencer since the change of value is imposed $D_1$ time.

Register S 1702a memorizes up to R components of a vector S, each component being the identifier of a process (a number). The input/output logic of register S is nothing more than prior art addressing and transferring logic in and out of the register. S1, S2 . . . SR are the components of register S. The index 1, 2 . . . R is the address of one of those registers. L indicates the address of selected registers. IS indicates the value to be stored into the register to be noted by an address for example $S_{L+1}$. These addressing techniques and circuitry are well-known to persons of ordinary skill in the computer art as is the transfer techniques and logic circuitry. "L" is utilized by the input/output logic as index:

outputs of register S are "S(L)" and "S(L+1)", input to register S is provided via "IS", and is entered as a new value for S(L+1). (Note that in the input/output logic is so adjusted that when "IS" and a new "L" are provided at the same time, the memorization of "IS" is based on the new "L", i.e. "IS" is stored into S(L+1) where L has the new value. This is the case of gates 1710, 1711, 1716).

To read the "Memory", where the Matrix of Relations is stored, an address is provided. The "Memory Address Identifier" combines the inputs "X", "Y", "B", "R" into B+X×R+Y which is the address of the Y-th element in the X-th row of a R×R matrix whose base address is B. "B" and "R" are constants provided by corresponding registers, while "X" and "Y" are the variable indexes of the wanted element in the matrix. When the address, computed as above, is ready, the order RE (Read) is issued to the Memory 102.

The Memory is searched for the wanted element, then, when "MO" (Memory Output) is loaded, it signals it by DO (Done). Note that DO signal, as RE above, lasts only for the time necessary for its utilization. For instance, it lasts a few time cycles or it is reset by $Q_5$.

Registers B, R, L, A, C, $CO_1$, $CO_2$, $F_1$, $F_2$ memorize corresponding values. The values B, R, L have been defined already; A and C are the identifiers of the processes in the basic question "does A precede C?" $CO_1$, $CO_2$ and $F_1$ and $F_2$ memorize the inputs for the "Comparator" and the "Arithmetic Unit" respectively.

The "Comparator" 1701b answers EQ (equal) or NE (non equal) and GR (greater) or LE (less or equal) with reference to "$CO_1$" versus "$CO_2$".

The "Arithmetic Unit" 1701c adds (ADD) and substracts (SUB) the two inputs "$F_1$", "$F_2$".

The elements of FIG. 17a implement the logic of FIG. 16a in hardware. To illustrate this fundamental fact, we discuss hereafter FIG. 17a by showing the direct correspondence existing among boxes in FIG. 17a and counts (Q) and gates in FIG. 17a. It may be helpful to note that the logic elements in FIG. 17a, part 1, are related to signal $D_1$ and therefore to the passages from one count (step) to the next; whereas the elements in FIG. 17a, part 2, are related to $D_2$ and to the operations performed by each step.

Initially the Sequencer 1701a indicates step $Q_0$. Gates 1701 and 1702 allow $D_1$ to reach the Sequencer, increasing the count from $Q_0$ to $Q_1$. $Q_1.D_2$ via gate 1710 loads "0" into Register L via gate 1710a and provides "A" as input "IS" to registers S via gate 1710b. As a consequence S(1) becomes =A. Next, gates 1701 and 1702 allow $D_1$ to reach the Sequencer 1701a, thus increasing the count to $Q_2$. $Q_2.D_2$ (gate 1711a) loads "1" into register L via gate 1710a and as input to S; therefore S(2) becomes equal to 1.

The operations described so far, involving steps $Q_1$ and $Q_2$, implement the operations indicated by box 1405 in FIG. 16a. $Q_2$ then opens OR gate 1701 which in turn opens, with $D_1$ being high, gate 1702 and increases the sequencer 1701a to step $Q_3$. $D_2.Q_3$, at gates 1712, 1712a and 1712b assign the values "S(L)" and "S(L+1)" to input "Y" and input "X" respectively of box 102a. On this basis, the Memory Address Identifier 102a computes the address of the element M(S(L+1), S(L)) and transmits it to the Memory 102 with the order to read (RE). Meanwhile the status changes from $Q_3$ to $Q_4$ (gates 1701-1702), and when Memory is ready (i.e. "MO" carries the wanted element and DO is "on"), $Q_4$·DO at gate 1701 in combination with $D_1$ at 1702 increases the Sequencer to $Q_5$.

These actions prepare for the branching described by diamond 1410 in FIG. 16a. In fact, $D_2.Q_5$ feeds the Comparator (gates 1713, 1713a and 1713b) and, if the result of the comparison is EQ (equal), gate 1704 ($D_1.Q_5.EQ$) forces the next step to be $Q_9$, whereas, if the result is NE (non equal), gates 1701 and 1702 increases the Sequencer to step $Q_6$. This is the branching action described by 1410 in FIG. 16a. Step $Q_6$ corresponds to diamond 1440 in FIG. 16a. In fact $D_2.Q_6$ (gate 1714, 1714a and 1714b) feeds the Comparator 1701b with "S(L+1)" and "C"; the result of the comparison cause either the operation to stop with the Answer YES (combination $D_1.Q_6.EQ$ at gate 1705) or to continue with step $Q_7$ (combination $Q_6.NE$ at gate 1701 and $D_1$ at 1702).

In case $Q_7$ is allowed, gates 1715, 1715a and 1715b feed the Arithmetic Unit with "L" and "1". Gates 1701 and 1702 increase then the count to $Q_8$, where gates 1716, 1716a and 1716b update register L with the new value L+1 (from "ADD") and assigns 1 as a new value to the component S(L+1) of register S. (Note that in S(L+1) the index L is based on the new value for L). These updates are the same as those described by box 1450 in FIG. 16a. As box 1450 is followed by operation 1410, step $Q_8$ is followed by $Q_3$ as indicated by gates 1706 and 1706a. If $Q_5$ had been followed by step $Q_9$ (as a result of $D_1.Q_5.E_Q$ at gate 1704), this and the next step ($Q_{10}$) carry the operation described by box 1415 in FIG. 16a. $Q_9.D_2$ (gate 1717a and 1717b) feeds the Arithmetic Unit 1701c then $Q_9$ and $D_1$ (gates 1701 and 1702) increase the Sequencer to $Q_{10}$. The combination $Q_{10}.D_2$ supplies the new value "ADD" for S(L+1), via gates 1718 and 1718a.

At the same time step $Q_{10}$ provides for next action (the branching described by 1420 in FIG. 16a) by supplying "S(L+1)" and "R" as input to Comparator (gates 1718, 1718a and 1718b). Branching is completed by gate 1707 (i.e. $D_1.Q_{10}.LE$) and gate 1707a which forces $Q_3$ as new step or by gates 1701 and 1702 (i.e. $Q_{10}.GR$ and $D_1$) which move the sequence to $Q_{11}$. Gate 1719 with $D_2.Q_{11}$ and gates 1719a and 1719b load "L" and "1" into the Comparator, which in turn provides either EQ, which causes gate 1708 (i.e. $D_1.Q_{11}.EQ$) to stop the operation with a final answer NO, or NE, which causes gates 1701 and 1702 to move Sequencer to $Q_{12}$. The whole action corresponds to the one described by diamond 1425 in FIG. 16a.

Step $Q_{12}$ and the successive $Q_{13}$ implement the operation of box 1435. In fact gate 1720 (i.e. $D_2.Q_{12}$) and gates 1720a and 1720b feed the Arithmetic Unit with "L" and "1", then step $Q_{13}$, created via gates 1701 and 1702, updates "L" with their difference ("SUB") at gates 1721 and 1721a. This action, which corresponds to box 1435 in FIG. 16a, is then followed by a jump to step $Q_9$, via gate 1709a (i.e. $Q_{13}.D_1$) and gate 1709a which correspond to operation in box 1415 as required.

In summary, the following parallelism can be established among the steps and the operations described by the flow diagram 16a and hardware diagram 17a parts 1 and 2: $Q_0$-1400; $Q_1$, $Q_2$-1405; $Q_3$, $Q_4$, $Q_5$-1410; $Q_6$-1440; $Q_7$, $Q_8$-1450; $Q_9$, $Q_{10}$-1415; $Q_{10}$-1420; $Q_{11}$-1425; $Q_{12}$, $Q_{13}$-1435.

Note that it is obvious that different embodiments of the same principle may consider the memorization of vector S and other entities in the Memory itself rather than on separate registers. The variations implied on gates and the sequence of events are of minor order and may lead to some saving and possibly slower operational time. We are not discussing them.

FIG. 17b implements the logic of FIG. 16b. Basically, FIG. 17b is the same as FIG. 17a, part 1, and accordingly the same numbering system will be used. However, there are some differences as follows:

Register V 1702b is added and has the capacity to memorize up to R components of a vector V, each component being of one bit. The Input/Output Logic of 1702b utilizes "S(L)" as index for the input SO and the outputs VS and VR. Input SO (Set One) sets to 1 the indexed component of V. Output VS (V Set) indicates that the indexed component of V is set to 1, whereas output VR (V Reset) indicates that the indexed component is in the reset or 0 condition. Input RA (Reset All) resets to 0 all components of V.

All differences between FIGS. 17a and 17b are due to vector (register) V, the functionality of which is to speed up the test (as for FIG. 16b versus 16a). This does not increase the number of steps in the Sequencer; it only adds a few extra outputs from the gates and splits gate 1706. Namely:

To comply with box 1455a of FIG. 16b, gate 1710c has the extra output RA.

Diamond 1465a in FIG. 16b is implemented by a split of gate 1706 of FIG. 17a into gates 1706b and 1706d of FIG. 17b. If VR=1 (i.e. V(S(L))=0) gate 1706b forces $Q_3$ as new step (as 1706 does in FIG. 17a ), but if instead VS=1 (i.e. V(S(L))=1) gate 1706b forces $Q_{12}$ as new step as required by the logic in FIG. 16b ($Q_{12}$ corresponds to operation 1435a ). Note: Since L has been changed during the time interval $D_2.Q_8$, it is assumed that the circuitry is fast enough to allow VR and VS above, to correspond to the new S(L) during the following time interval $D_1.Q_8$.

Box 1460a is implemented by gate 1720c, FIG. 17b , part 2, which differs from 1720, FIG. 17a part 2, in the extra connection to SO.

The following correspondence exists among the steps Q and the box numbers of FIG. 16b:

$Q_0$-1400a; $Q_1$, $Q_2$-1455a; $Q_3$, $Q_4$, $Q_5$-1410a; $Q_6$-1440a; $Q_7$, $Q_8$- 1450a/1465a; $Q_9$, $Q_{10}$-1415a; $Q_{10}$-1420a; $Q_{11}$-1425a; $Q_{12}$-1460a; $Q_{12}$, $Q_{13}$-1435a.

RESUMING THE WAITING PROCESSES

FIGS. 7, 14 and 15 describe the main portion of the No Dependency mechanism, but to have it complete it is necessary to describe also that part that resumes at due time, the processes in a WAIT status.

When a process enters the WAIT status, a symbol 3 is recorded in M.R. at the intersection between the row corresponding to the waiting process and the column corresponding to the process that caused the wait. The process shall resume its activity when the other is terminated and cleared.

This action can be so described:

all processes having a 3 in the column of the cleared process will be released one at a time;

each process is submitted again to the general test (FIG. 7, or 14 for example) for the access being allowed;

U.T.s., M.R. and A.R.L.s. are updated accordingly.

The simpler implementation of this mechanism is described by FIG. 18.

START. It corresponds to the event "a process has been cleared".

Diamond 1801. It tests whether at least one process is waiting for the event. If none, no further action is taken. If at least one is waiting, it enters Box 1802.

Box 1802. The selected process is released. This means that the process is submitted to the general test (FIG. 7 or equivalent). As a result, the process may resume its activity, enter another wait or be aborted depending upon the circumstances.

Exit of this Box goes back to Diamond 1801.

For those systems where it is likely that many processes are waiting for the same event, it is wise to release the processes in a sequence that reduces the probability of creating interferences. Such a sequence is any one in agreement with the existing time relations among the processes.

A preferred embodiment of this philosophy is shown in FIG. 18a.

Once the processes to be released are arranged in a list p1, p2, . . . pi, . . . pn (Box 1801a), if the list is not empty (Diamond 1802a) nor contains just one process to release (Diamond 1803a) two pointers i and j are set to 1 and 2 respectively (Box 1805a).

The function DETECT is now applied (Diamond 1806a). It is important to note that the function is exactly the one described in connection with FIGS. 16a and 16b or equivalent ones, but the context is different. DETECT is used to determine whether $p_j$ can follow $p_i$. In the context of FIG. 7 and the like, it checks the insurgence of an interference or a deadlock; here instead it sequences the releases in a way, not in contrast with the existing relations, to minimize the risk of subsequent interferences. (Note, as it will be recalled later, that this case is an example of possible use of the claimed function (DETECT) in a context different from the original one).

If DETECT approves the relation, the next $p_j$ is tested against $p_i$ (Boxes 1808a, 1809a and again 1806a). If the relation is rejected instead, $p_j$ substitutes (i.e. becomes the new) $p_i$ (Box 1807a) in the continuation of the test. Due to the transitive property of the time relations, it is not necessary to test the new $P_i$ against the already tested processes, since if they did not show to precede old $P_i$ they cannot possibly precede the new $P_i$ which precedes the old $P_i$.

When all processes have been tested (exit YES of diamond 1809a) $p_i$ is released (Box 1810a) and the remaining processes are consolidated in a new list (Box 1811a), that will be submitted to the very same releasing procedure.

One by one all processes are released. As pointed out in connection with Box 1802 of FIG. 18, to release a process means that the process enters again the general test (FIG. 7 or equivalent one) which caused its waiting status and which now determines its future course once more.

Note: the mechanism described in FIGS. 18 and 18a is by no means confined to the No Dependency method. It is an absolute general mechanism for the release of waiting processes no matter what cause generated the wait. Therefore, the problem of resuming the waiting processes will not be discussed again in the following sections that deal with the generalization of the protection mechanisms. Simply, it will be assumed that this mechanism is adopted.

THE GENERAL MECHANISM OF PROTECTION

As stated in Section 11 of the General Discussion, the No Dependency mechanism is a special case of the general mechanism. In particular, FIG. 8 is the generalization of FIG. 7.

Let's describe this aspect with some details.

FIG. 8 is hereafter described with reference to FIG. 7, i.e., the differences between the two figures are discussed.

Diamond 801. When the requesting process wants to read its own version of the resource, Diamond 801 authorizes it immediately (branching to Box 802). Diamond 701 of FIG. 7 can also authorize a rewrite because in the No Dependency mechanism no other process could have read that version. Both, Diamond 801 and Diamond 701 authorize the repetition of a previous read.

Box 803. This box is utilized initially and every time the request is rerouted. Assuming that the request is originally addressed to the last version of the resource and rerouted back one version at a time, the relations to clear are:
- to read: the applicant must follow the writer of the addressed version of the resource.
- to write: the applicant must follow the readers and the writer of the addressed version of the resource.

Box 703 of FIG. 7 operates differently because of the special rules of the No Dependency: (a) only two versions at most; (b) read initially addressed to the cleared version; (c) write addressed to the last version. This makes it convenient to obtain from Box 703 all information possibly needed with just one access to it.

Diamond 805. Interferences are detected with the DETECT operation, as in the case of Diamond 705 of FIG. 7. Exit NONE of Diamond 805 branches to Diamond 812 because interferences could have been detected during previous passages through Diamond 805 and noted by Box 813. Instead, Diamond 705 branches directly to Diamond 709 in FIG. 7, because it can be accessed only once.

Diamond 806. When a request to read is rejected, it is rerouted to the previous version of the resource, assuming that the version is accessible. No restorations are implied, i.e., the mechanism branches to Box 815 which notes this fact and continues to Diamond 803.

When a request to write is rejected, the interferences are noted by Box 813, then a branching decision is made by Diamond 814.

Diamond 814. If the writer of the requested version interferes with the applicant, the request is rerouted to the previous version (Box 815) to test whether that version is a viable solution. If, instead, the interferences are confined among the readers, rerouting is not an issue and Box 807 is immediately accessed. Note that when a request to write is rerouted by Box 815, no restoring action is taken at the moment, the main purpose being to collect information for Box 807 on the extension (or depth) of the interferences in order to decide on the best course of action. If Box 807 decides to abort the previous writer, rerouting will actually take place, but the interference can also be cured in a different way, e.g. by abortion of the requester itself. In any case, a restoration is made. In the No Dependency case, Diamond 706 of FIG. 7 branches directly to Box 707 or 711 because the alternative are limited and further explorations are not necessary.

Diamond 807. As diamond 707 in FIG. 7, Diamond 807 identifies the best restoring action, then actuates it. In both cases the rules are those described in Section 8 of the General Discussion, but in the No Dependency case the absence of dependent processes allows further simplification.

For the general mechanism the preferred embodiment is the following:
- Two candidacies are considered. The first candidacy includes the requesting process and the processes which depend upon it.
- The second candicacy is the list of all processes for which the precedence relations with the requesting process have been rejected, plus all processes which depend upon them.
- If the first candidacy includes fewer processes than the second, the requesting process and its dependents are aborted, otherwise the processes in the list are aborted.

Refinements of this rule include a minimization of the list (as described in Section 8 of the General Discussion), and a comparison of the candidacies based upon the weights rather than upon the number of processes.

Diamond 809. The algorithm, which derives from the restrictions that characterize the specifics of the mechanism, is applied to identify the exit. (In FIG. 7 the rule was spelled out explicitly).

It is probably redundant to stress further that, as for the No Dependency, the general mechanism can be implemented with many variations, beside FIG. 8. The common element is in any case the fact that:
- The request for the utilization of a resource is approved by a check that applies rules in agreement with the principle discovered by the inventor.
- Violation of the rule can redirect the request or cause an action of recovery, depending upon the circumstances.
- The operation having been cleared, other algorithms and criteria can decide whether the access is allowed.
- In any case the new status is recorded so that the mechanism operates on updated information.

In a sense it can be said that the additional restrictions are the main element that characterizes the various subclasses of this mechanism. A special case is the "Free Ride", where additional restrictions are not imposed. Another case is the No Dependency. Similar to this is the "One Non-Cleared Version". It differs from the No Dependency insofar as it allows reading the non-cleared version, therefore creating a dependency. Waiting is only caused by a request to write a second non-cleared version of a resouce. A trivial extension is the "n versions" (per resource) where the waiting is imposed, if the number of versions of a resource reaches a certain value n. Another case is the "limited space for temporary storage", where the system allows the creation of non-cleared versions of the resources until the area reserved for temporary storage is filled up.

The list of subclasses is far from being exhausted by these few examples.

As a final note it may be worthwhile to repeat the observation previously made that in general the additional requirements call for the possibility of a Wait status, but that this is by no means an absolute rule since all consequences can be considered in the very general case. All these consequences (delays, rejections, etc.) are implied in the present description even though they are not explicitly mentioned.

THE GENERALIZED DETECT

The discussion in the previous section describes the general mechanism of protection. Yet another important aspect of the generalization deserves a detailed presentation and discussion, i.e., the generalized DETECT function or instruction and its related tools.

Let us consider some examples.

The Free Ride mechanism allows two types of relations: (1) "follows but does not depend" (symbol 1 in the preferred embodiment of it) and (2) "follows and depends" (symbol 2). From the pure interference point of view there is no need for a distinction between the two symbols, but the distinction is appreciated by the restoring portion of the mechanism (secondary aborts). The procedure to identify dependents may also use this generalized DETECT to perform its task.

Analogously, the No Dependency mechanism uses "follows but does not depend" (symbol 1) and "waits" (symbol 3). Again, for the interference check both symbols are considered, whereas symbol 3 is the key to resume the waiting process.

When both dependency and wait are assumed, as in the general case, at least 3 symbols, beside zero, are to be considered. Again, for the check for interference the distinction may not be necessary, because it only matters whether the symbol is equal to zero or not. It may be important however, for other portions of the mechainism, as for restoring, resuming and the like.

As a matter of fact more than 3 symbols can be convenient to characterize the relations among the processes in the general case. As an example, the "wait" may deserve 3 symbols of its own, like "follows, depends and now waits", "follows without dependency and now waits", and "did not follow, but now waits".

Any subclass of the general mechanism utilizes a convenient subset of symbols, large in some cases and small in others.

Similar considerations can obviously be extended to the personalizations of the U.T.s. or A.R.L.s., but we will not insist on those.

In all the implementations discussed so far, it has been shown a check for interference sensitive to any non-zero symbol in M.R., rather than to some selected symbols. This is not always desired. For example, if a symbol does not imply a precedence relation, it must be ignored by the check.

Since the general mechanism can utilize the matrix to carry other information beside the precedence relations, the generalization of the check for interference requires that the DETECT be implemented with the capability of discriminating among symbols, in order to cope with the peculiarities of all possible variations of the mechanism.

Therefore for the implementation of a general mechanism, two basic DETECT functions or instructions are here claimed:

DETECT or DETECT ALL, with no indication of symbols meaning DETECT on all non-zero symbols.

DETECT (p, q, . . . ), where p, q, . . . are the selected symbols to which the operation has to be sensitive.

The first corresponds to the one utilized so far and whose firmware and hardware preferred embodiments have been described in relation with FIGS. 16a, 16b, 17a and 17b.

The second, DETECT (p, q, . . . ), allows the specification of selected symbols to which the function has to be sensitive in performing the operation.

For this function or instruction we present the firmware hardware embodiments of FIGS. 19a, 19b, 20a and 20b. Their description (see next section) is perfectly analogous to the one given for the corresponding FIGS. 16a, 16b, 17a and 17b with the following difference: the test that DETECT bases upon the fact that a retrieved symbol is "equal to zero", is based instead by DETECT (p, q, . . . ), upon the fact that the symbol "is no p, nor q, nor . . . ".

The generalization has been introduced at the beginning of this section as a requirement for some implementations of the general mechanism against interference.

The usefulness of such a generalization is even more evident when the DETECT function is utilized outside the main area of the check for interference.

In any case it is rather obvious that in order to permit the full exploitation of an instruction like DETECT, (in a protection mechanism or not) the capability of discriminating among symbols is essential.

The extension of the family of the DETECT instruction (or functions) can be sought also in another direction, i.e., the association, to the original DETECT, of additional functionalities. These associations can be very instrumental for the implementation of fast mechanisms. In particular, DETECT can be merged with functions performed by adjacent boxes in the operational diagram of the mechanisms.

In another very useful extension, DETECT clears for interference a process against a whole set of processes instead of one at a time.

Although the next Section describes embodiments for only one of the above-mentioned generalizations, the other extensions can be obtained with similar adaptations from the embodiments of FIGS. 16a, 16b, 17a, 17b, 19a, 19b, 20a, 20b and they will not be explicitly discussed hereafter.

With respect to any of the additional characteristics, all extensions belong to the DETECT family of instructions or functions, which utilizes and operates on the relationships among processes in a manner and/or with purposes which are peculiar of the present inventions.

THE IMPLEMENTATION OF THE GENERALIZED DETECT

We here limit the discussion to a fundamental pair of embodiments which generalize the ones described in connection with FIGS. 16a, 16b, 17a and 17b.

Figure 19A:
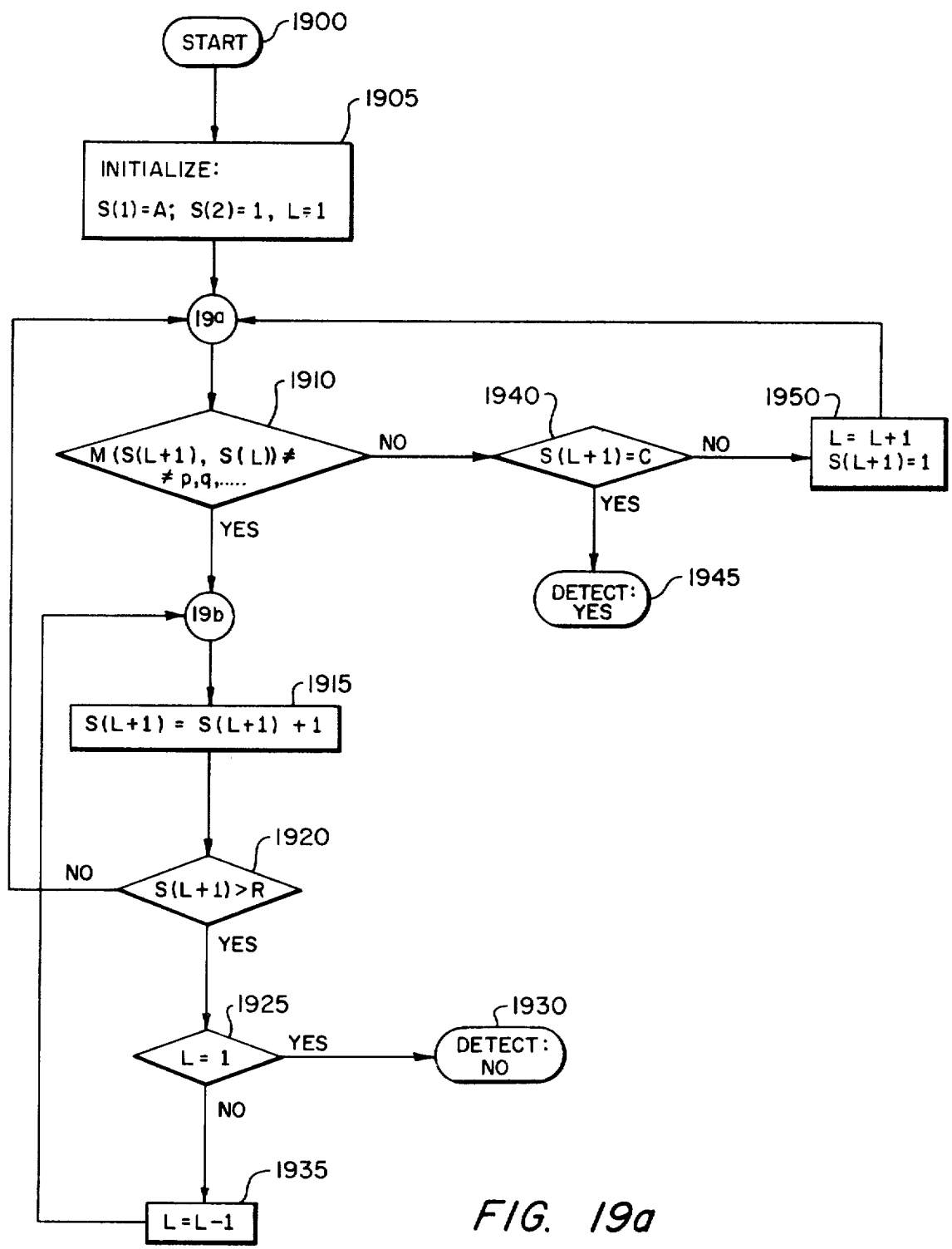
FIGS. 19a and 19b show two implementations of the DETECT (p,q . . .) function of the invention.

FIGS. 19a and b present the basic embodiments of DETECT (p, q, . . . ), where p, q, . . . are the symbols to which the operation has to be sensitive.

Figure 19B:
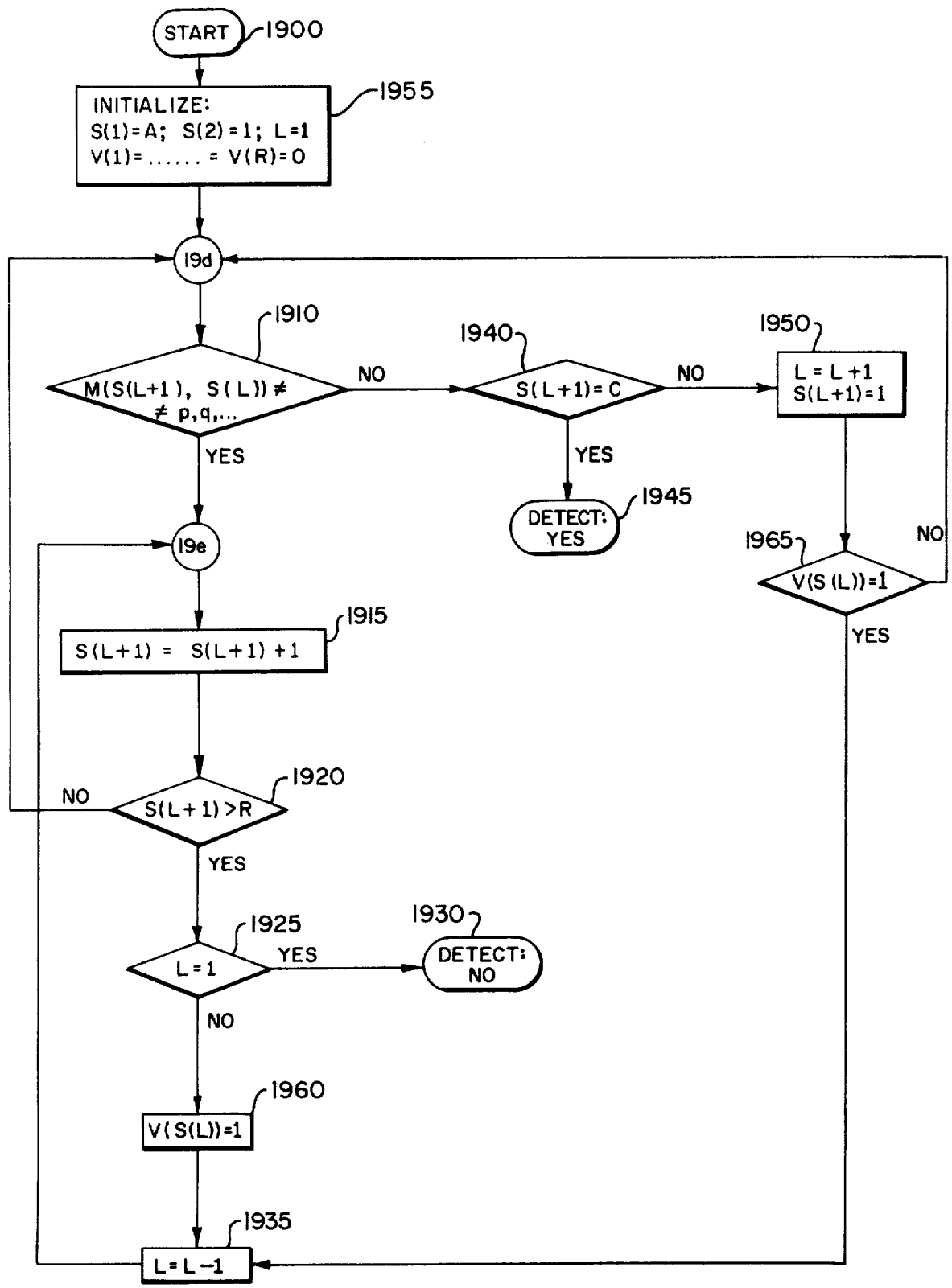

The same description used for FIGS. 16a and b can be used for FIGS. 19a and 19b. The only difference is in the Diamond 1910, since Diamond 1910 compares the retrieved symbol with p, q, . . . , declared by the instruction, and branches to Diamond 1940 if the symbol is equal to one of them, whereas it addresses Box 1915 if the symbol is different from them all. This is obviously a generalization of the comparison of the symbol with 0, done at Diamond 1410 or 1410a.

FIG. 19b (as 16b) shows the modification that utilizes the vector V to speed up the operation by keeping track of the branches that have already been checked. All the observations and suggestions for improvements made for FIGS. 16a and b hold for FIGS. 19a and b too.

The PL1 program listings disclosed for the DETECT operation are easily transformed into those for DETECT (p, q, . . . ).

The following is a PL1 program listing for the operation corresponding to the embodiment shown in FIG. 19a:

L=1;
S(1)=A;
S(2)=1;
19a if M(S(L+1), S(L))=p, then go to 1940;
if M(S(L+1), S(L))=q, then go to 1940;
. . .
19b: S(L+1)=S(L+1)+1;
if S(L+1) ^>R, then go to 19a;
if L=1, then go to 1930;
L=L−1;
go to 19b;
1940: if S(L+1)=C, then go to 1945;
L=L+1;
S(L+1)=1;
go to 19a;
where the conditional statements "if M(S(L+1), S(L))=. . . " are as many as the symbols to check for.

The following is a PL1 program listing for DETECT (p, q, ... ) according to the embodiment shown in FIG. 19b:

```
do X=1 to R;
V(X)=0;
end;
L=1;
S(1)=A;
S(2)=1;
go to 19d;
1965: if V(S(L))=1, then go to 1935;
19d: if M(S(L+1), S(L))=p, then go to 1940;
     if M(S(L+1), S(L))=q, then go to 1940;
...
19e: S(L+1)=S(L+1)+1;
     if S(L+1) ∧ >R, then go to 19d;
     if L=1, then go to 1930;
     V(S(L))=1;
1935: L=L−1;
      go to 19e;
1940: if S(L+1)=C, then go to 1945; L=L+1;
      S(L+1)=1;
      go to 1965;
```

The conditional statements "if M(S(L+1), S(L))=.. ." are as many as the symbols to check for. In this and the preceding program, 1945 and 1930 are labels for exits corresponding to DETECT YES and DETECT NO.

The same line of reasoning that was used in connection with FIGS. 16a and 16b can be used here to state that FIGS. 19a and 19b are sufficient to permit a firmware/hardware implementation of the functions to the person of ordinary skill in the control techniques for Data Processing Systems.

In order to cope with special cases where the usual facilities may not be available and to ease the independent implementation of the function in other areas of application, FIGS. 20a and 20b are provided as a specific hardware implementation. To prevent undue burdening of the description with matter within the knowledge of those skilled in the art, the level of detail is the same used for FIGS. 17a and 17b and the individual engineer is free to select elements and components from his own background. The details are sufficient to those in the art to understand and implement the invention.

To illustrate FIGS. 20a and 20b, the same notes and observations provided in connection with FIGS. 17a and 17b can be used, with the following additional notes:

A multicomparator 2002d is provided. It owns a set of registers which are loaded with the values "p", "q", ... by the same mechanism that decodes the instruction (i.e. DETECT (p, q, ... )) at the beginning of the operation. The multicomparator has one input "MC" which is compared with "p", "q", etc. The multicomparator has two outputs (of one bit only) MD (i.e. Multicomparison indicates Different) or ME (i.e. Multicomparison indicates Equal). When "MC" is different from all elements of comparison, MD is "set" by the multicomparator and "ME" is "reset"; when instead "MC" is equal to one of the elements, ME is "set" and MD is "reset". In other words a Multicomparator is a combination of simple comparators. The answer MD (i.e. "different") is the AND of all the single answers "Different", ME (i.e., "equal") is the OR of all the single "Equal".

At step $Q_5$ (gates 2013 and 2013a) the symbol retrieved from the memory ("MO") is loaded into the multicomparator; the answer ME or MD conditions the passage to the next step ($Q_6$ or $Q_9$) (gates 2001, 2002, or gates 2004 and 2004a).

It is implied that the time necessary for the multicomparison is shorter than the interval $D_2$ to $D_1$.

FIG. 20a corresponds to the logic of FIG. 19a and FIG. 20b to the logic of FIG. 19b.

As previously discussed in connection with the simple DETECT function, many variations can be considered that go from the inclusion of additional functionalities to the selection of alternate equivalent logical sequences. For simplicity these variations are not discussed, being understood that the principles of the present inventions can be applied or implemented in many similar modes without departing from the true spirit and scope of the invention.

What is claimed is:

1. In a multiprogramming/multiprocessing computer system for executing a plurality of processes sharing common information in the form of records, pages or messages, apparatus for operating said system to avoid interferences between processes seeking access to said common information comprising:

first memory means storing utilization data identifying processes which have accessed said information;

second memory means storing precedence data representing the relative order in which said processes identified in said utilization data must access said information in accordance with a predetermined set of access rules;

identification means coupled to said first memory means for sensing said stored utilization data in response to a request made by a first process to access said information, said identification means responding to said utilization data to generate a precedence indication identifying any second process which has precedence over said first process to said information in accordance with said access rules; and search means coupled to said second memory means and to said identification means for sensing said stored precedence data and for rejecting said access request made by said first process if said precedence data indicates that said first process has precedence to said information over any process identified by said precedence indication, whereby the possibility of an interference occurring between two processes relative to said information is prevented.

2. The apparatus set forth in claim 1 further comprising:

means included in said search means for approving said access request if said second memory means does not contain precedence data pertaining to said first process.

3. The apparatus set forth in claim 1 further comprising:

means included in said search means for approving said access request if said precedence data indicates that said processes identified by said precedence indication have precedence to said information over said first process.

4. The apparatus set forth in claim 1 further comprising:

means included in said search means for approving said access request if there is precedence data in said second memory means pertaining to said first process and said precedence data indicates that said first process has precedence to said information only with respect to processes other than the processes identified by said precedence indication.

5. The apparatus set forth in claim 2 further comprising:

means responsive to said search means for storing in said second memory means, if said access request is approved, additional precedence data indicating that each process identified by said precedence indication has precedence to said information over said first process.

6. The apparatus set forth in claim 4 wherein said precedence data pertaining to said first process is stored in said memory means in the form of a series of recorded access digits grouped in an area of said second memory means associated with said first process, each said recorded access digit representing a condition of precedence or non-precedence of said first process with respect to another process, the identity of said other process being represented by the location within said area occupied by said respective digit, and wherein said search means comprises:

means for sequentially sensing the access digits in said second memory means area pertaining to said first process;

means coupled to said sensing means for determining for each access digit sensed whether said digit represents a condition of precedence or non-precedence and, for each precedence digit, whether its location within said area associates it with a process identified by said precedence indication; and means responsive to said determining means for rejecting said access request if said determining means determines that a precedence digit is associated with a process identified by said precedence indication.

7. The apparatus set forth in claim 6 wherein:

said sensing means further operates to sequentially sense the access digits in the areas of said second memory means associated with each additional process, other than the processes identified by said precedence indication, for which a precedence digit is detected in said area pertaining to said first process; and said determining means further operates to determine for each access digit read for said additional processes whether said digit represents a condition of precedence or non-precedence and, for each precedence digit, whether its location within its respective area associates it with a process identified by said precedence indication.

8. The apparatus set forth in claim 7 further comprising:

means for approving said access request if no precedence digit read is associated with a process identified by said precedence indication.

9. The apparatus set forth in claim 8 further comprising:

means responsive to said search means for storing in said second memory means, if said access request is approved, additional precedence data indicating that each process identified by said precedence indication has precedence to said information over said first process.

10. The apparatus set forth in claim 4 further comprising:

means responsive to said search means for storing in said second memory means, if said access request is approved, additional precedence data indicating that each process identified by said precedence indication has precedence to said information over said first process.

* * * * *